(12) United States Patent
Muguruma

(10) Patent No.: US 9,252,879 B2
(45) Date of Patent: Feb. 2, 2016

(54) VISIBLE LIGHT RECEIVING METHOD AND APPARATUS USING THE SAME

(71) Applicant: UNIVERLINK INC., Nagoya-shi, Aichi (JP)

(72) Inventor: Hiroshi Muguruma, Nisshin (JP)

(73) Assignee: UNIVERLINK INC., Aichi (JP)

(*) Notice: Subject to any disclaimer, the term of this patent is extended or adjusted under 35 U.S.C. 154(b) by 10 days.

(21) Appl. No.: 14/204,600

(22) Filed: Mar. 11, 2014

(65) Prior Publication Data
US 2014/0354846 A1 Dec. 4, 2014

(30) Foreign Application Priority Data

Jun. 4, 2013 (JP) .................................. 2013-118240
Sep. 6, 2013 (JP) .................................. 2013-185386

(51) Int. Cl.
*H04B 10/116* (2013.01)
*H04N 5/225* (2006.01)
*H04N 5/232* (2006.01)

(52) U.S. Cl.
CPC ............ *H04B 10/116* (2013.01); *H04N 5/2254* (2013.01); *H04N 5/23203* (2013.01)

(58) Field of Classification Search
CPC . H04B 10/116; H04N 5/2254; H04N 5/23203
USPC ..................................................... 348/222.1
See application file for complete search history.

(56) References Cited

U.S. PATENT DOCUMENTS

| | | | |
|---|---|---|---|
| 6,476,864 B1 | 11/2002 | Borg et al. | |
| 2005/0265731 A1* | 12/2005 | Keum et al. | 398/183 |
| 2008/0297615 A1* | 12/2008 | Kagawa et al. | 348/222.1 |
| 2010/0098439 A1 | 4/2010 | Shin et al. | |
| 2011/0052214 A1* | 3/2011 | Shimada et al. | 398/202 |
| 2012/0170947 A1* | 7/2012 | Kim et al. | 398/202 |
| 2013/0251374 A1 | 9/2013 | Chen et al. | |

FOREIGN PATENT DOCUMENTS

| | | |
|---|---|---|
| EP | 1439649 A1 | 9/2002 |
| JP | 2008-283446 A | 11/2008 |
| JP | 2011-55288 A | 3/2011 |
| WO | 2014/037866 A1 | 3/2014 |

OTHER PUBLICATIONS

Extended European Search Report dated Oct. 23, 2014, issued in corresponding European Application No. 14157646.2. (7 pages).

* cited by examiner

*Primary Examiner* — Gevell Selby
(74) *Attorney, Agent, or Firm* — Westerman, Hattori, Daniels & Adrian, LLP

(57) ABSTRACT

A visible light is photographed through an optical diffusion filter with a camera of a portable terminal. The camera includes a pixel amplifier sequential output type imaging element in which electric charges generated in respective pixels are amplified by respective pixel amplifiers, to output imaging signals in sequence from the respective pixel amplifiers. A striped pattern based on an information signal is generated in the column direction or row direction in the imaging element, in a photographed optically-diffused image. The information signal is extracted to be demodulated on the basis of a state of generation of the striped pattern.

22 Claims, 12 Drawing Sheets

VISIBLE LIGHT RECEIVING METHOD AND APPARATUS USING THE SAME

BACKGROUND OF THE INVENTION

1. Field of the Invention

The present invention relates to a visible light receiving method and an apparatus of the method which are used for visible light communication. In particular, the present invention relates to a visible light receiving method and an apparatus of the method which are suitably usable in a portable terminal such as a personal digital assistant, a mobile telephone which is equipped with a digital camera, a digital video camera, or the like.

2. Description of Related Art

In recent years, visible light communication using a visible light as a communication medium has been developed, and a visible light communication apparatus that performs visible light communication by use of a visible light such as an illuminating ray has been proposed in JP No. 2008-283446 A and the like.

With respect to this conventional visible light communication apparatus, a visible light communication apparatus which superimposes a transmitting signal on a visible light to send it operates so as to generate a transmitting signal by performing modulation by the 4-level PPM method (pulse-position modulation) onto an information signal (pulse signal) to be transmitted, to apply the transmitting signal to a light source using an LED to drive the LED, and superimpose the transmitting signal on a visible light irradiated from the LED, to transmit it.

Further, in this visible light communication apparatus, in order to effectively use an ordinary use light source for illumination as a light source of the visible light communication apparatus, at the time of applying a PPM signal to the LED light source for illumination, the LED is continuously lit during a period of a digital value of "0" which is relatively long, and the LED is operated to blink on and off at a shorter frequency by a sub-carrier carrier signal during a period of a digital value of "1" which is short in time, thereby securing necessary illuminance for illumination at the time of transmission in visible light communication.

On the other hand, in recent years, portable terminals such as mobile telephones have become remarkably popular, and most people carry portable terminals with them on a daily basis. Further, because a digital camera available for video recording is normally mounted in this type of portable terminal, users live in an environment where they can routinely photograph with a camera.

Therefore, conventionally, in JP No. 2011-55288 A, there has been proposed a visible light communication apparatus which photographs a visible light irradiated from a light source for illumination serving as a light source of the visible light communication apparatus that performs visible light communication, that is, an illuminating ray for visible light communication on which an information signal to be transmitted is superimposed with a camera of a portable terminal or the like, and analyzes the photographed image data to extract a data bit string contained in the image data, and demodulates information signal data transmitted from the data bit string.

However, because the above-described visible light communication apparatus photographs the light source of the visible light communication apparatus with, for example, a light source for illumination serving as a visible light source with a digital camera or a video camera, that is, directly photographs a luminous visible light irradiated from the light source for illumination (light from the light source) with the camera, the exposure of the camera is logically automatically adjusted for the entire viewing surface. Therefore, an image of the light source on the photographed image goes blank so as to be photographed in an overexposed state.

Therefore, even if the image data photographed by the camera is subjected to image processing, it is extremely difficult to precisely extract visible light transmission data contained in the image data in an overexposed state even for an image processing technology of a microcomputer operating at high speed.

Further, when photographing a visible light, even in the case where a photographed image is not brought into an overexposed state, because a contour and the like of the image are contained as noise in visible light transmission data, it is difficult to precisely extract the visible light transmission data from the image data.

In addition, a general-purpose digital camera or video camera photographs a moving image at 16 frames to 30 frames per second, and calculates luminance values of image data of the respective frames, to capture the luminance value data as time-series data for each frame number, and further calculates the maximum luminance value and the minimum luminance value in the calculated luminance value data, to extract a data bit string of receiving data on the basis of a predetermined threshold value.

For this reason, the camera photographs image data at an extremely long time axis or with a long time interval that is $\frac{1}{16}$ seconds to $\frac{1}{30}$ seconds, and extracts a data bit string of transmission data on the basis of the luminance value data for each frame. Therefore, if a visible light image is photographed at a speed of 30 frames/sec., data of one sample are acquired with respect to one frame, and the one sample data are extracted for about 33 milliseconds, that is, the extraction of receiving data is at extremely low speed.

The visible light communication apparatus usually performs multilevel PPM modulation such as 4-level PPM modulation onto a transmitting signal, to generate a transmitting signal, and superimposes the transmitting signal on a visible light irradiated from an LED to transmit it. However, in this case, a frequency of a transmitted pulse signal generated by the PPM modulation is about 9.6 KHz, for example, in the case where a data transmission speed is 4.8 kbps, and the signal has a single pulse width of a data bit string of about 0.1 milliseconds, that is an extremely short time axis. This pulse width is an extremely short time as compared with the respective frame times of an image photographed by a camera.

Therefore, in the visible light receiving apparatus using a conventional camera, in addition to the fact that it is extremely difficult to extract receiving data from an image including a contour of an object photographed by the camera, or image data in an overexposed state by image processing, it is impossible to extract received data at high speed because transmission data transmitted through visible light communication (for example, in the case of a data transmission speed of 4.8 Kbps, a signal at a frequency of about 9.6 kHz) is acquired at a speed of 1 sample for one frame.

SUMMARY OF THE INVENTION

An object of the present invention is to provide a visible light receiving method and a visible light receiving apparatus which are capable of photographing a visible light for visible light communication, and receiving an information signal for visible light communication by use of a portable terminal or the like equipped with a general-purpose camera. It is possible to achieve the object of the present invention by a visible light receiving method and a visible light receiving apparatus with the following configurations.

That is, the visible light receiving method of the present invention includes photographing a visible light irradiated for visible light communication with a camera having an imaging element, and receiving an information signal which is superimposed on the visible light to be transmitted, on the basis of image data of the imaging element photographed by the camera, and the apparatus in which the camera photographs an image not to be formed by use of a pixel amplifier sequential output type imaging element, and the imaging element amplifies electric charges generated in respective pixels by respective pixel amplifiers, to output imaging signals in sequence from the respective pixel amplifiers, and carries out image processing of image data acquired from the imaging signals by frame, and extracts and demodulates information signals of a plurality of samples in one frame.

In addition, "image not to be formed" means that an image of an object captured by a camera is not imaged on an imaging element of the camera. For example, an object image of light passing through a diffusion filter, a defocused image out of focus, an object image of light which does not pass through a light-concentrating optical system, or the like is an "image not to be formed." Further, in the case where a light source is photographed through a diffusion filter or via a white screen type reflecting plane with a camera, even in the case of coming into focus on the diffusion filter or the screen type reflecting plane, the light source serving as an object is an "image not to be formed."

In accordance with this invention, because it is possible to extract a plurality of samples of information signals contained in one-frame image data in one processing, it is possible to receive transmission data at high speed as compared with the conventional art. Further, because the imaging element photographs an image not to be formed, as compared with the case where a normal camera forms an image of an object through its lens, to photograph an object image, it is possible to precisely extract receiving data without having an effect of noise such as a contour of a formed image.

Further, currently, because a pixel amplifier sequential output type imaging element is used for a general-purpose camera, for a portable terminal such as a mobile telephone in which a general-purpose camera is mounted, there is no need to provide a dedicated light receiving element for receiving a visible light for visible light communication, and it is possible to easily receive an information signal for visible light communication by use of a general-purpose portable terminal.

Here, the above-described camera allows the visible light to be incident onto the above-described pixel amplifier sequential output type imaging element through an optical diffusion filter, to photograph an optically-diffused image of the visible light, and the imaging element accumulates electric charges in the pixels in the row or the pixels in the column at a timing for each row or each column of pixels, to output signals based on the electric charges accumulated in the respective pixels in sequence at timings for respective pixels from the pixel amplifiers of the respective pixels, and generates a striped pattern based on an information signal in the row direction or the column direction of the pixels in a photographed optically-diffused image, thereby it is possible to extract and demodulate the information signal on the basis of a state of generation of the striped pattern.

In accordance with this, in a portable terminal or the like in which a camera is mounted, when an optical diffusion filter is mounted in the camera, to photograph an optically-diffused image by the imaging element, a striped pattern corresponding to an information signal is clearly generated in the row direction or the column direction in the optically-diffused image, and because the striped pattern contains a contrast change in luminance of a transmitted visible light, i.e., a transmitted information signal which changes according to a time axis, it is possible to extract the transmitted information signal through visible light communication on the basis of a state of generation of the striped pattern.

Further, here, the above-described camera allows the visible light to be incident onto the pixel amplifier sequential output type imaging element through the optical diffusion filter, to photograph an optically-diffused image of the visible light, and the pixel amplifier sequential output type imaging element accumulates electric charges at timings for respective pixels, to output signals based on the electric charges accumulated in the respective pixels in sequence at timings for respective pixels from the pixel amplifiers of the respective pixels, and generates an intermittent pattern which is intermittent on the basis of an information signal in a row or in a column of the pixels in the photographed optically-diffused image, thereby it is possible to extract and demodulate the information signal on the basis of a state of generation of the intermittent pattern generated in the row or in the column.

In accordance with this, in a portable terminal or the like in which a camera is mounted, when an optical diffusion filter is mounted in the camera, to photograph an optically-diffused image by the imaging element, the pixel amplifier sequential output type imaging element accumulates electric charges at timings for respective pixels, to output signals based on the electric charges accumulated in the respective pixels in sequence at timings for respective pixels from the pixel amplifiers of the respective pixels, thereby generating an intermittent pattern which is intermittent on the basis of an information signal in a row or in a column of the pixels in the photographed optically-diffused image. Because this intermittent pattern contains a contrast change in luminance of a transmitted visible light, i.e., a transmitted information signal which changes according to a time axis, it is possible to extract the transmitted information signal transmitted through visible light communication on the basis of a state of generation of the intermittent pattern.

Further, here, as the above-described optical diffusion filter, a film liquid crystal that switches between optical diffusion and optical transmission according to an applied voltage may be used. In accordance with this, in the case where a film liquid crystal is installed in an optical path of a camera, and the camera is used for normal photography, when the film liquid crystal filter is switched to an optical transmitting state, and the camera is used as a receiving apparatus for visible light communication, the film liquid crystal can be easily switched to an optical diffusion state, to be used.

Further, here, in the above-described visible light receiving method, the above-described camera allows a defocused image not to be formed, to be incident, to photograph the defocused image, and the pixel amplifier sequential output type imaging element accumulates electric charges in the pixels in the row or the pixels in the column at a timing for each row or each column of pixels, to output signals based on the electric charges accumulated in the respective pixels in sequence at timings for respective pixels from the pixel amplifiers of the respective pixels, and generates a striped pattern on the basis of the information signal in the row direction or the column direction of the pixels in the photographed defocused image, thereby it is possible to extract and demodulate the information signal on the basis of a state of generation of the striped pattern.

Moreover, in the above-described visible light receiving method, the above-described camera allows a defocused image not to be formed, to be incident onto the pixel amplifier sequential output type imaging element, to photograph the defocused image, and the pixel amplifier sequential output type imaging element accumulates electric charges at timings for respective pixels, to output signals based on the electric charges accumulated in the respective pixels in sequence at timings for respective pixels from the pixel amplifiers of the respective pixels, and generates an intermittent pattern which is intermittent on the basis of an information signal in a row or in a column of the pixels in the photographed defocused image, thereby it is possible to extract and demodulate the information signal on the basis of a state of generation of the intermittent pattern generated in the row or in the column.

Further, here, in the above-described visible light receiving method, the above-described camera in which a light-concentrating optical system is taken out of an optical path of a visible light, allows an image not to be formed, to be incident onto the pixel amplifier sequential output type imaging element, to photograph the image, and the imaging element accumulates electric charges in the pixels in the row or the pixels in the column at a timing for each row or each column of the pixels, to output signals based on the electric charges accumulated in the respective pixels in sequence at timings for respective pixels from the pixel amplifiers of the respective pixels, and generates a striped pattern on the basis of the information signal in the row direction or the column direction of the pixels in the photographed image, thereby it is possible to extract and demodulate the information signal on the basis of a state of generation of the striped pattern.

Moreover, in the above-described visible light receiving method, the above-described camera in which a light-concentrating optical system is taken out of an optical path of a visible light, allows an image not to be formed, to be incident onto the pixel amplifier sequential output type imaging element, to photograph the image, and the imaging element accumulates electric charges at timings for respective pixels, to output signals based on the electric charges accumulated in the respective pixels in sequence at timings for respective pixels from the pixel amplifiers of the respective pixels, and generates an intermittent pattern which is intermittent on the basis of an information signal in a row or in a column of the pixels in the photographed image, thereby it is possible to extract and demodulate the information signal on the basis of a state of generation of the intermittent pattern generated in the row or in the column.

Further, here, a CMOS image sensor may be used as the pixel amplifier sequential output type imaging element of the camera. Because the CMOS image sensor may be operated such that electric charges generated in respective pixels are amplified with respective pixel amplifiers, so as to output signals in sequence from the respective pixel amplifiers, it is possible to contain a transmitted information signal in a striped pattern generated in one frame of image data, and to extract the transmitted information signal at high speed on the basis of a striped pattern generated in the direction of the respective rows or the columns, or an intermittent pattern generated in a row or in a column of pixels.

Moreover, a color image signal which is imaged by the camera to be output may be subjected to gray-scale transformation, so as to be transformed into a black-and-white image signal, and to extract its luminance component. Further, a color image signal which is imaged by the camera to be output may be configured such that a luminance component is extracted for each color signal.

Further, in the visible light receiving method which generates a striped pattern on the basis of the information signal in the row direction of the imaging element, and extracts and demodulates the information signal on the basis of a state of generation of the striped pattern, an average value of luminance components output from pixels in the respective row lines along the row direction of the pixels, to generate luminance data of the respective row lines, and it is possible to digitalize the luminance data to extract a received information signal.

On the other hand, a visible light receiving apparatus of the present invention which photographs a visible light irradiated for visible light communication with a camera having an imaging element, and receives an information signal which is superimposed on the visible light to be transmitted, on the basis of image data from the imaging element photographed by the camera, the apparatus includes a pixel amplifier sequential output type imaging element in which electric charges generated in respective pixels of the imaging element are amplified by respective pixel amplifiers, to output signals in sequence from the respective pixel amplifiers, an optical diffusion filter which changes the visible light into a diffusion light, to be incident to the imaging element of the camera, and generates a striped pattern on the imaging element, and photographing means for photographing the striped pattern of the visible light generated on the imaging element through the optical diffusion filter, the apparatus in which a striped pattern corresponding to the received information signal is generated in the row direction or the column direction of the pixels in the photographed optically-diffused image, thereby extracting and demodulating the information signal on the basis of a state of generation of the striped pattern.

In accordance with the visible light receiving apparatus of the present invention, when the optical diffusion filter is mounted in the camera, to photograph an optically-diffused image by the imaging element, a striped pattern corresponding to an information signal is generated in the row direction or the column direction in the optically-diffused image. Because the state of generation of the striped pattern contained in the photographed image contains an information signal transmitted through visible light communication, to extract the information signal from this striped pattern, for a portable terminal such as a mobile telephone in which a general-purpose camera is mounted, there is no need to provide a dedicated light receiving element for receiving a visible light for visible light communication, and it is possible to easily receive an information signal for visible light communication by use of a general-purpose portable terminal.

Further, the visible light receiving apparatus includes an optical diffusion filter which changes the visible light into a diffusion light, to be incident to the imaging element of the camera, and generates an intermittent pattern on the imaging element, and photographing means for photographing the intermittent pattern of the visible light generated on the imaging element through the optical diffusion filter, the apparatus in which an intermittent pattern which is intermittent corresponding to the received information signal is generated in a row or in a column of the pixels in the photographed optically-diffused image, thereby extracting and demodulating the information signal on the basis of a state of generation of the intermittent pattern generated in the row or in the column.

Moreover, the visible light receiving apparatus includes a pixel amplifier sequential output type imaging element in which electric charges generated in respective pixels of the imaging element are amplified by respective pixel amplifiers, to output signals in sequence from the respective pixel amplifiers for the respective pixels, and photographing means for allowing a defocused image not to be formed, to be incident onto the imaging element, to photograph a striped pattern generated in the defocused image, the apparatus in which a striped pattern corresponding to the received information signal is generated in the row direction or the column direction of the pixels in the photographed defocused image, thereby extracting and demodulating the information signal on the basis of a state of generation of the striped pattern.

Further, the visible light receiving apparatus includes a pixel amplifier sequential output type imaging element in which electric charges generated in respective pixels of the imaging element are amplified by respective pixel amplifiers, to output signals in sequence from the respective pixel amplifiers for the respective pixels, and photographing means for allowing a defocused image not to be formed, to be incident onto the imaging element, to photograph an intermittent pattern generated in the defocused image, the apparatus in which an intermittent pattern which is intermittent corresponding to the received information signal is generated in a row or in a column of the pixels in the photographed defocused image, thereby extracting and demodulating the information signal on the basis of a state of generation of the intermittent pattern generated in the row or in the column.

In this way, in accordance with the visible light receiving method and the visible light receiving apparatus of the present invention, it is possible to photograph a visible light for visible light communication by use of a general-purpose camera, and easily receive an information signal transmitted for visible light communication at high speed.

DESCRIPTION OF THE PREFERRED EMBODIMENTS

Figure 1:
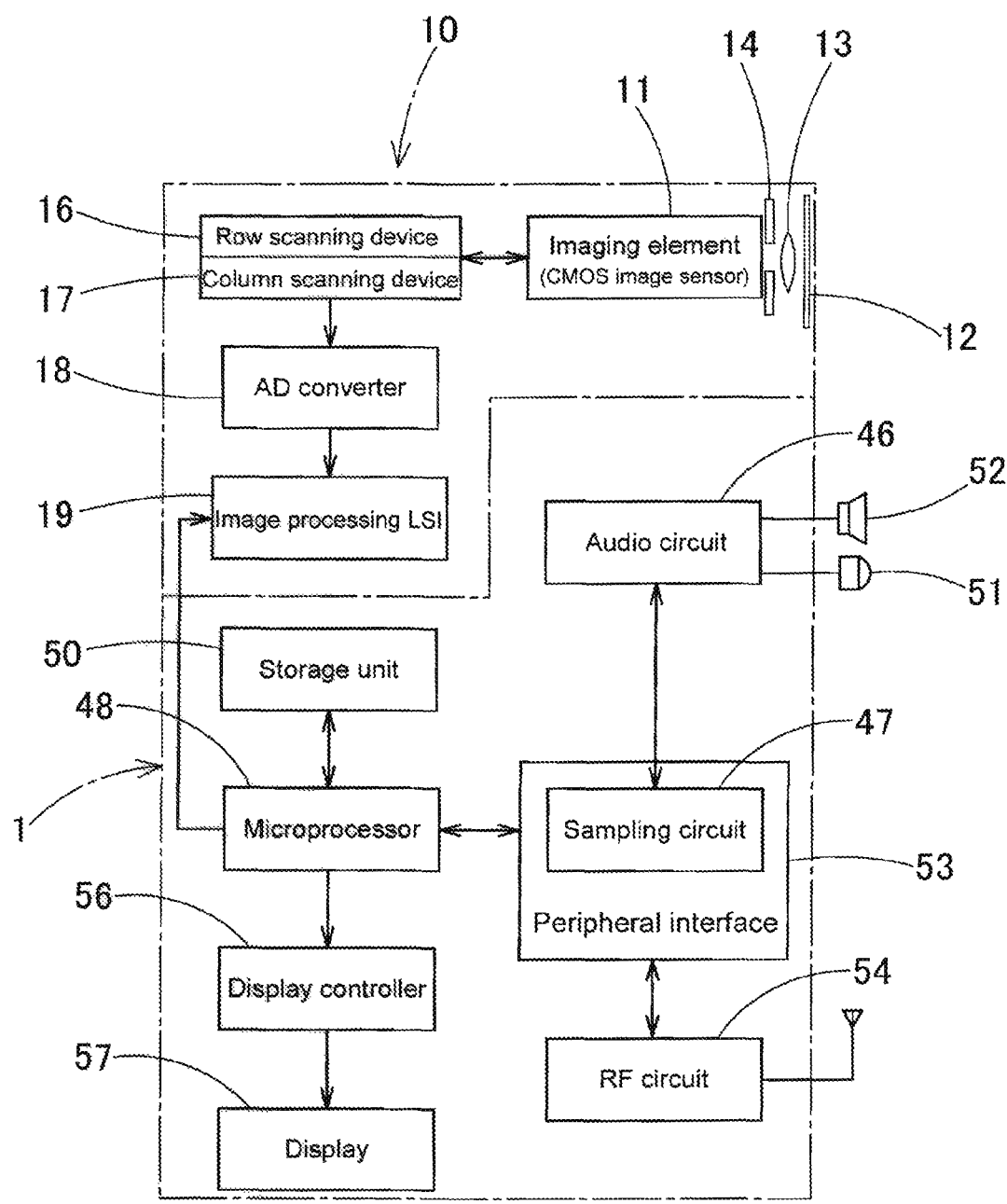
FIG. 1 is a configuration block diagram of a visible light receiving apparatus showing an embodiment of the present invention.

Hereinafter, the present invention will be described on the basis of an embodiment shown in the drawings. In addition, the invention is not limited to the embodiment. Any modifications within the requirements of Claims or equivalents relating to the requirements should be contained in the scope of Claims.

FIG. 1 shows a schematic configuration block diagram of a portable terminal 1 equipped with a visible light receiving apparatus that receives a visible light for visible light communication.

The portable terminal 1 is a terminal device in which a camera (digital camera) 10 such as a mobile telephone is mounted, that photographs a still image or a moving image by operating a function switch and the like in a camera mode of the portable terminal 1. When photographing a still image or a moving image, the portable terminal 1 receives an information signal of a visible light transmitted for visible light communication.

As shown in FIG. 1, in an optical incident part of the camera 10, an imaging lens 13 is installed, an iris 14 having a diaphragm function is disposed on the inner side of the lens 13, and an imaging element 11 is disposed on the inner side of the iris (iris diaphragm mechanism) 14, which allows a visible light of a photographed image to be incident thereto through the lens 13 and the iris 14. The iris 14 may be a diaphragm mechanism in place of an ND filter (neutral density filter).

An optical diffusion filter 12 is disposed in front of the lens 13 in order to receive a visible light signal transmitted for visible light communication, that diffuses and causes a light from an object to be incident to the camera 10, so as to be a diffusion light in a blurring state, and photographs the visible light. With this, the diffusion light of the object is incident to the camera 10, and even if a projector of a visible light transmitter that projects a visible light for visible light communication is an illumination fixture such as a spotlight, it is possible to photograph the visible light for visible light communication without overexposing the image of the light source from the projector, and without contrast or a contour of the object having a harmful effect (noise) on extraction of a striped pattern, and it is possible to clearly generate a striped pattern or an intermittent pattern in the image.

The optical diffusion filter 12 is composed of a sheet glass or a film sheet such as a ground-glass or an optical diffusion film which has an optical diffusion layer, and at the time of receiving a visible light, the optical diffusion filter 12 may be pasted on the outer surface of the lens 13 exposed to the outside of the portable terminal 1, to be used. Further, the apparatus may have a structure in which the optical diffusion filter 12 is installed so as to be movable inside the portable terminal 1, and at the time of receiving a visible light, the optical diffusion filter 12 is moved so as to enter in the incident optical path by a switch operation or the like, and at the time of using the camera for normal photography, the optical diffusion filter 12 is moved so as to get out of the optical path.

Further, the optical diffusion filter 12 may be composed of a film liquid crystal that switches between optical diffusion and optical transmission according to an applied voltage. The film liquid crystal is a thin and lightweight liquid crystal filter with the inside filled with superimposed films, for example, TN liquid crystal, and for a normal time, the liquid crystal is switched to an optical transmitting state, to be available for use as a normal camera, and at the time of receiving a visible light, the liquid crystal is brought into an optical diffusion state such as being milky white according to an applied voltage. Such a film liquid crystal may be conveniently used as an optical diffusion filter 12 which is capable of switching between optical diffusion and optical transmission.

As the imaging element 11 of the camera 10, the pixel amplifier sequential output type imaging element 11 in which electric charges generated in respective pixels 21 are amplified by respective pixel amplifiers 22, and imaging signals are output in sequence from the respective pixel amplifiers 22, is built into the portable terminal 1. As a pixel amplifier sequential output type imaging element, a CMOS image sensor is an imaging element in which electric charges generated in pixels are amplified by respective pixel amplifiers, and imaging signals are output in sequence from the respective pixel amplifiers, and therefore may be suitably used. The pixel amplifier sequential output type imaging element 11 is configured as shown in FIG. 2, and its scanning device is composed of a row scanning device 16 that performs scanning along the row direction, and a column scanning device 17 that performs scanning along the column direction.

Figure 2:
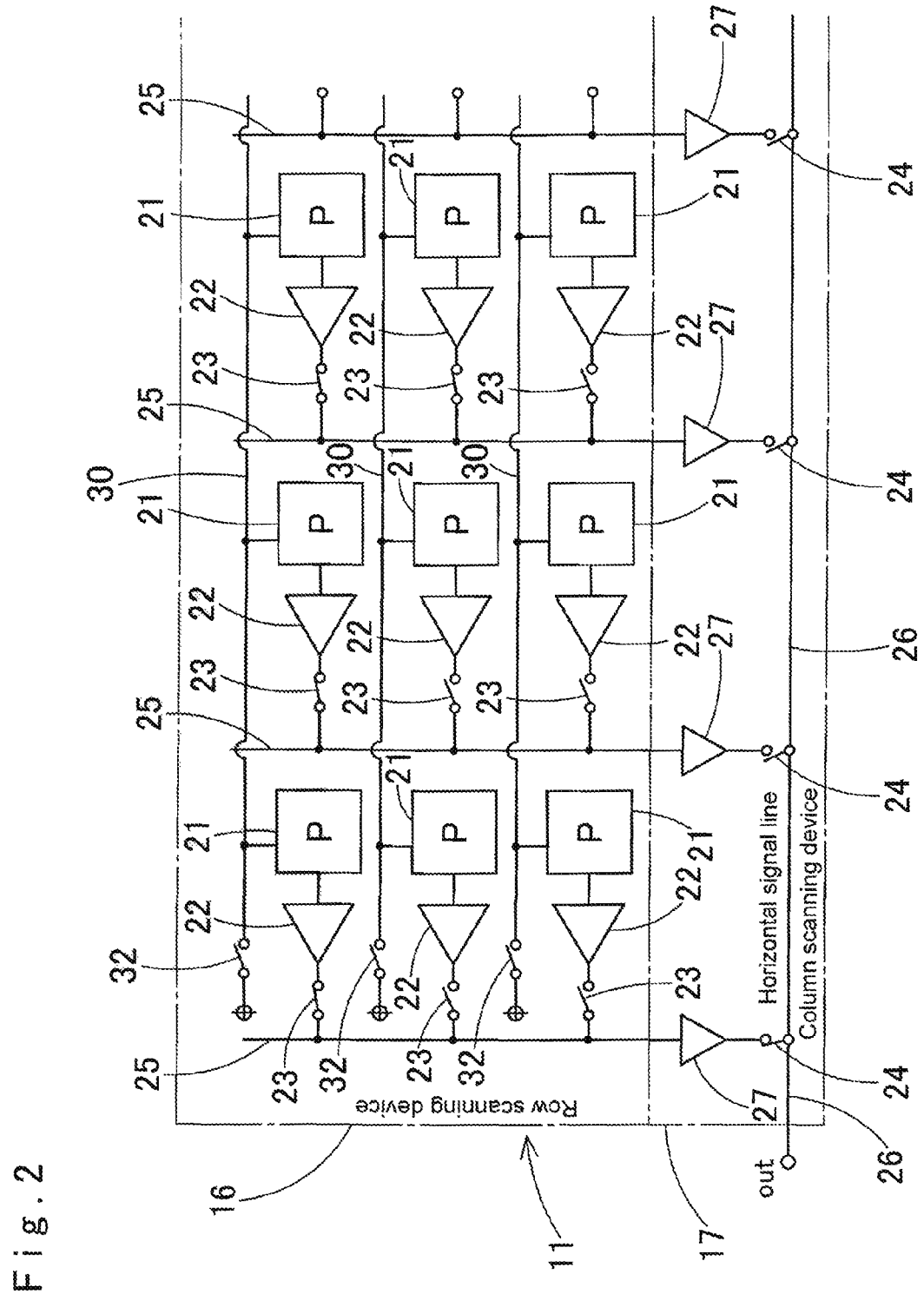
FIG. 2 is a schematic configuration block diagram of a pixel amplifier sequential output type imaging element.
Figure 3:
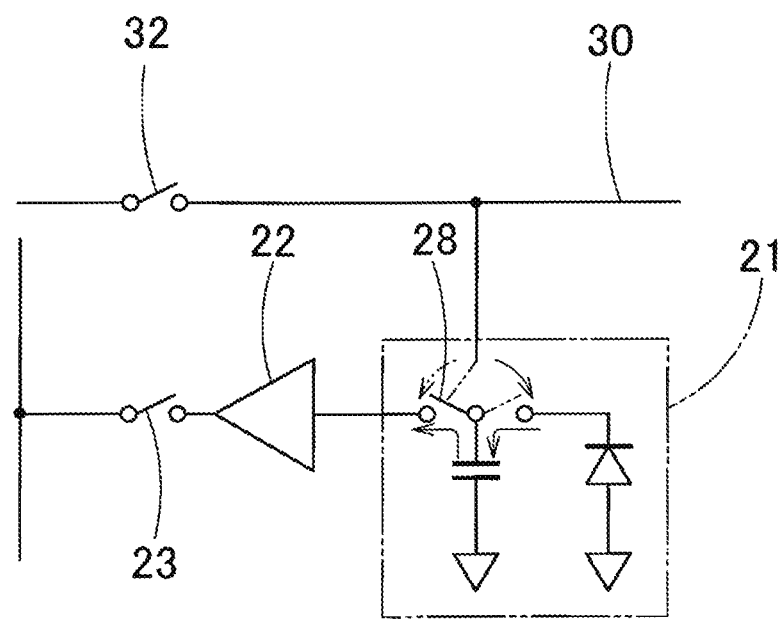
FIG. 3 is a circuit configuration explanatory diagram of a pixel.

In the pixel amplifier sequential output type imaging element 11 formed of a CMOS image sensor, as shown in FIG. 2, many pixels 21 are arrayed in a matrix state of rows and columns. As shown in FIG. 3, the respective pixels 21 are each configured to have a light receiving element and a capacitor unit for accumulating electric charges generated in the light receiving element, and to switch between electric charge accumulation generated at the time of exposure and pixel signal output on the basis of the accumulated electric charges according to a switching operation of the changing-over switch 28.

Figure 5:
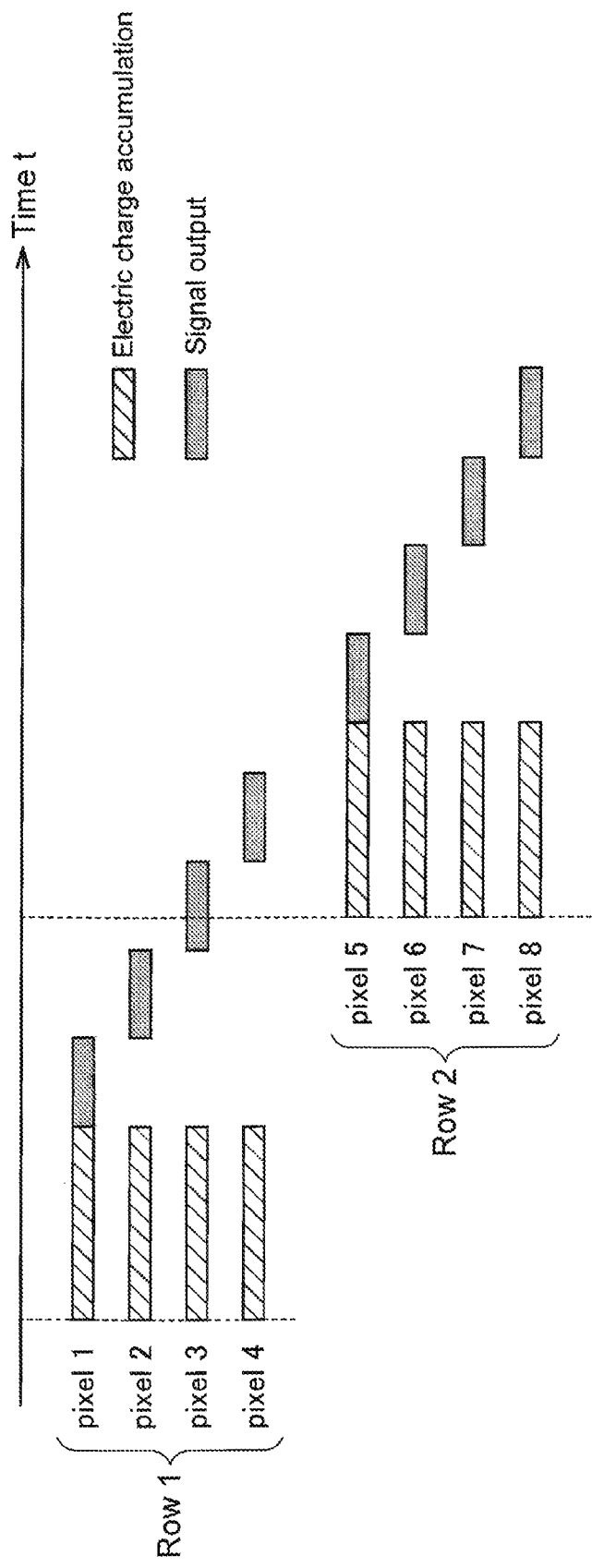
FIG. 5 is an explanatory diagram showing electric charge accumulation timings in the respective pixels, and signal output timings of the respective pixels.

With respect to the exposure timings, i.e., the electric charge accumulating operations in the respective pixels 21, as shown in FIG. 5, shutter signal lines 30 are installed with respect to the respective rows of the pixels 21 in order for the pixels 21 in the same row to perform electric charge accumulations at the same accumulation timing, and the pixels 21 in the respective rows perform electric charge accumulations at the same timing for each row on the basis of a signal from the shutter signal line 30. Row selecting switches 32 are connected to the shutter signal lines 30 installed along the respective rows. As shown in FIG. 5, the respective rows of the pixels 21 perform electric charge accumulations, i.e., exposure operations at timings shifted in sequence row by row, and with respect to signal outputs after the electric charge accumulations, signals based on the electric charges are output in sequence from the pixels 21 in the row in which electric charges have been accumulated, and pixel signals are output in sequence from all the pixels 21.

As shown in FIG. 2, the pixel amplifiers 22 are respectively provided on the output sides of the respective pixels 21, and the output sides of the pixel amplifiers 22 are connected to vertical signal lines 25 via the pixel selecting switches 23. The row scanning device 16 is connected such that electric charges in the respective pixels 21 arrayed in a matrix state are amplified by the pixel amplifiers 22, to be transmitted to the respective vertical signal lines 25 in the column direction, which are connected to the output sides thereof through the pixel selecting switches 23, and signals based on the electric charges in the respective pixels 21 in the respective rows are output in sequence through the respective vertical signal lines 25.

The column scanning device 17 is configured such that column selecting switches 24 connected to the output sides of the respective vertical signal lines 25 are connected to one horizontal signal line 26, and the vertical signal lines 25 in the column direction are selected by on-off control of the respective column selecting switches 24, and signals based on their loading are output from the pixels 21 in the respective vertical signal lines 25 through the one horizontal signal line 26. Therefore, the respective vertical signal lines 25 are disposed along the column direction, and the output sides of the pixels 21 in the respective row lines, which are disposed in the direction of the respective rows, are connected to the vertical signal lines 25 via the pixel amplifiers 22 and the pixel selecting switches 23. The vertical signal lines 25 are extended toward the column direction, and disposed parallel to the columns along the many pixels 21 disposed on the respective columns in a matrix state. Second amplifiers 27 are connected to the bottom ends of the respective vertical signal lines 25, and the output sides of the second amplifiers 27 are connected to the one horizontal signal line 26 via the column selecting switches 24.

On the other hand, in the row scanning device 16, as described above, the shutter signal lines 30 are installed along the respective rows of the pixels 21, and the respective pixels 21 in the same row are configured to perform electric charge accumulations simultaneously at an exposure timing based on a signal from this shutter signal line. The connection is made such that output signals from the pixels 21 are output on the basis of switching operations of the changing-over switches 28 and operations of the pixel selecting switches 23 after electric charge accumulations, and as shown in FIG. 5, pixel signals are output in sequence from all the pixels 21 in the respective rows and columns when photographing.

With this, when the shutter of the camera 10 is turned on, to photograph a visible light, in the pixel amplifier sequential output type imaging element 11, in the pixels 21 in the respective rows, the respective pixels 21 in the same row perform electric charge accumulations at the same timing. After the electric charge accumulations, signals based on the accumulated electric charges are output in sequence from all the pixels 21, to be amplified by the pixel amplifiers 22, and thereafter, the signals are transmitted to the vertical signal lines 25 on the basis of switching operations of the pixel selecting switches 23 and switching operations of the column selecting switches 24, to be output through the horizontal signal line 26.

That is, when a transmitted visible light is photographed by the camera 10, in the imaging element 11, in FIG. 2, the row selecting switch 32 of the shutter signal line 30 at the top stage is turned on, and electric charge accumulations are simultaneously performed in the pixels 21 at the top stage. Next, the row selecting switch 32 of the shutter signal line 30 in the second row is turned on, and electric charge accumulations are performed in the pixels 21 in the second row. Thereafter, electric charge accumulations are performed in sequence in the pixels 21 in the order of the third row, the fourth row, and the final row, that is, the electric charge accumulations are performed at exposure timings in which exposures (electric charge accumulations) for every respective row are shifted in sequence row by row. On the other hand, after performing the electric charge accumulations, as shown in FIG. 5, pixel signals based on the electric charges are output in sequence from the pixels 21 at the top stage of the pixels 21 in the respective rows.

At this time, in the imaging element 11 shown in FIG. 2, first, the pixel selecting switch 23 at the top stage, which is connected to the leftmost vertical signal line 25 is turned on, and the leftmost column selecting switch 24 connected to the horizontal signal line 26 is turned on, thereby outputting a signal from the leftmost pixel 21 at the top stage. Next, the pixel selecting switch 23 of the second pixel 21 from the left end in the same row is turned on, and the column selecting switch 24 connected to the second vertical signal line 25 is turned on, thereby outputting a signal from the second pixel 21 in the same row. In this way, first, the signals based on the accumulated electric charges are output in sequence from the pixels 21 in the top row, and next, the signals are output in sequence from the leftmost pixel 21 in the second row, and such operations are continued in the third row and the fourth row, and the signals are finally output in sequence from the pixels 21 in the bottom row.

As described above, in the imaging element 11 of FIG. 2, when photographing, exposure operations are performed such that the row selecting switch 32 thereof is turned on from the shutter signal line 30 at the top stage, and electric charge accumulations are simultaneously performed in the pixels 21 at the top stage, and next, the row selecting switch 32 of the shutter signal line 30 in the second row is turned on, and electric charge accumulations are performed in the pixels 21 in the second row. After the electric charge accumulations, as shown in FIG. 5, pixel signals based on the electric charges are output in sequence from the pixels 21 at the top stage of the pixels 21 in the respective rows. With this, finally, the signals are output from the pixels 21 in the bottom row through the rightmost vertical signal line 25, to take in a one-frame image signal.

As shown in FIG. 5, because the electric charge accumulating operations, i.e., the exposure timings in the respective rows of the pixels 21 are performed in sequence so as to be shifted in the imaging element 11, and the exposure timings in the pixels from the top row to the second row and the third row are shifted in sequence, for example, in the case where a time for taking in a one-frame image signal is a frame rate of the camera (for example, $1/30$ seconds to $1/60$ seconds), and there is a temporal contrast in a visible light on which transmission data is superimposed, the signals output from the pixels in the respective rows and columns in one frame contain the transmission data of the visible light in a time in which the pixels in one frame are exposed.

Therefore, in the case where a visible light subjected to, for example, 4-level PPM modulation is transmitted at 4.8 Kbps from the projector (illumination fixture) of the visible light transmission device that performs visible light communication on the basis of the visible light communication standard (CP1222), a time denoting one sample of a transmitted pulse signal superimposed on the visible light is about 0.5 milliseconds, and a contrast change in luminance of the visible light containing this transmitted pulse signal is generated as a striped pattern in a photographed image by the imaging element 11. Therefore, when a visible light for visible light communication is photographed by the imaging element 11, a striped pattern containing an information signal is imaged in its one frame, and the image signal is transmitted to the image processing apparatus through the scanning device.

The camera 10 built into a general-purpose mobile telephone usually has a pixel amplifier sequential output type imaging element (CMOS image sensor) 11 built-in, and in the case where the number of pixels thereof is, for example, 12,000,000 pixels, the pixels are arrayed, for example, in 3000 rows×4000 columns, that composes one frame. Because a time for taking in signals from the respective pixels of one frame of the imaging element 11 is a frame rate of the camera 10, in the case of photographing at a frame rate of $1/30$ seconds, for example, because a time of one frame is about 33 milliseconds, and a time of 1 bps of an information signal for visible light communication based on the above-described visible light communication standard is about 0.25 milliseconds, information signals of a plurality of samples are available in the visible light receiving apparatus using the camera 10 by photographing one frame.

In addition, in the visible light receiving apparatus of this embodiment, a color image signal which is imaged by the camera 10 to be output is subjected to gray-scale transformation, to be transformed into a black-and-white image signal, and its luminance component is extracted. However, with respect to color image signals which are photographed by the camera to be output, its luminance component may be extracted from each color signal.

Further, in this embodiment, an example in which a visible light containing ID information is transmitted from a visible light transmitter for visible light communication (not shown) will be described. However, in that case, unique ID information is respectively allocated to be set to a plurality of visible light transmitters, and those ID information may be sufficiently contained in one-frame image data.

Further, the camera 10 is used so as to photograph a single still image, and demodulate a transmission data signal that is transmitted through visible light communication on the basis of the image data containing a striped pattern, to regenerate or display the signal. However, the camera 10 is capable of photographing a moving image with a projector (illumination fixture) of a visible light transmission device that performs visible light communication serving as an object, to take in image data of a plurality of frames, and retrieving the transmission data signal from striped patterns contained in those data.

Moreover, the above-described embodiment is configured, as shown in FIG. 2, such that the shutter signal lines 30 are installed along the row direction of the pixels 21 (in the horizontal cross direction in FIG. 2), and electric charge accumulations, i.e., exposure operations are performed simultaneously and at timings shifted in sequence row by row with respect to the pixels 21 in the respective rows. However, the embodiment may be configured such that the shutter signal lines are installed along the column direction of the pixels 21 (in the vertical direction in FIG. 2), and electric charge accumulations are performed simultaneously and at timings shifted in sequence column by column with respect to the pixels 21 in the respective columns.

In this case, a striped pattern which is imaged in one frame of a photographed image, and contains an information signal contained in a transmitted visible light is generated in the column direction of the pixels 21. That is, as described above, in the case where electric charge accumulations are performed simultaneously and at timings shifted in sequence row by row with respect to the pixels 21 in the respective rows, a striped pattern along the row direction (horizontally-striped pattern) is generated in a photographed image. On the other hand, in the case where electric charge accumulations are performed simultaneously and at timings shifted in sequence column by column with respect to the pixels 21 in the respective columns, a striped pattern along the column direction (vertically-striped pattern) is generated in a photographed image, and because transmitted transmission data are contained in the striped pattern, it is possible to extract the transmitted data on the basis of the striped pattern.

Figure 6:
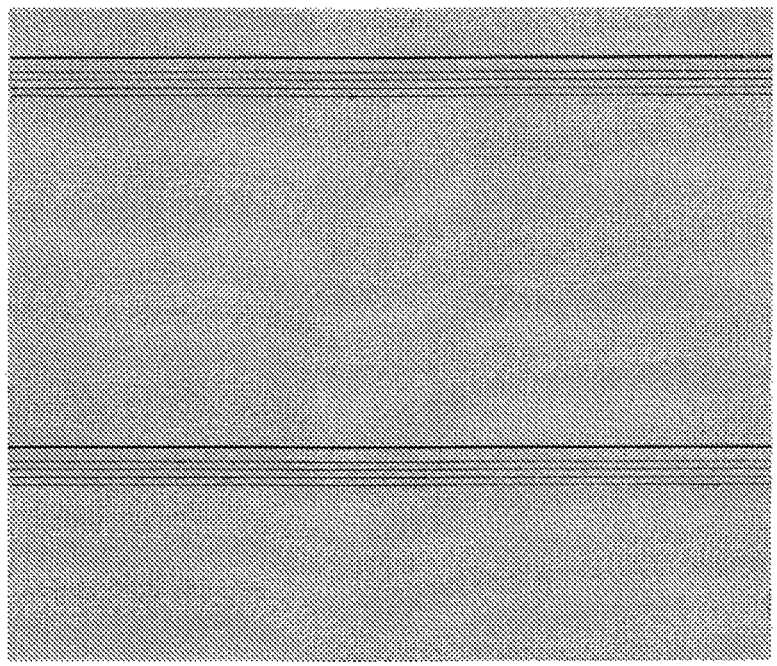
FIG. 6 is an explanatory diagram of an image that an image signal of the imaging element is subjected to gray-scale transformation, to be transformed into a black-and-white image signal, and its luminance component is extracted.

The image processing apparatus that processes a photographed image signal is, as shown in FIG. 1, equipped with an AD converter 18 and an image processing LSI 19, and is configured to convert an image signal into a digital signal through the AD converter 18, and take the digital signal into the image processing LSI 19, to perform image processing. When the image processing LSI 19 takes in the image digital signal containing color information and luminance information therein, the image processing LSI 19 retrieves only the luminance information, to transform the luminance information into gray-scale data of 0 to 255 gradations, for example, and extracts the luminance component of the signal, i.e., the striped pattern component, and transmits the sampled data to a microprocessor 48 as shown in FIG. 1. Such a striped pattern in a one-frame photographed image is, as shown in FIG. 6, generated as a crosswise striped pattern in the photographed image, and an information signal for visible light communication is contained in a state of generation of the respective crosswise strips. Then, the microprocessor 48 demodulates the transmitted information signal on the basis of the above-described sampled data. Accordingly, means for extracting and demodulating an information signal on the basis of generation of a striped pattern generated in a row or in a column of the pixels 21 of the above-described invention is composed of the image processing LSI 19, the AD converter 18, and the microprocessor 48.

The portable terminal 1 has the camera 10 built-in as described above, and is composed of a PDA or a tablet type terminal connectable to a wireless LAN, or a mobile telephone connectable to a mobile telephone communication network or a wireless LAN, and is connected to a network such as the Internet through a wireless LAN or the like.

Further, the portable terminal 1 is, as shown in FIG. 1, composed chiefly of the microprocessor 48, and includes a storage unit 50 composed of a RAM, a ROM, or the like, and a peripheral interface 53 including an input/output circuit and the like. The portable terminal 1 is capable of touch input for various function switch input, and is equipped with a touch sensitive display 57 on which a moving image, a still image, a text, and the like are displayed, a display controller 56 that performs control of the touch sensitive display 57, and the like. Moreover, the portable terminal 1 is equipped with an RF circuit 54 for the connection to a wireless LAN or a mobile telephone communication network, and is connectable to a wireless LAN or a mobile telephone communication network through the peripheral interface 53 and the RF circuit 54.

Browser software, audio playback software, visible light receiving processing software, and the like are stored in advance in the storage unit 50 of the portable terminal 1. The microprocessor 48 of the portable terminal 1 takes in the transmission data signal (image data) for visible light communication which is photographed by the camera 10 having the above-described configuration, to calculate an average value of luminance components in the row direction, and further digitalizes the averaged luminance data of the respective rows, and extracts a received PPM signal (PPM modulated signal) from the digitalized data, to demodulate the PPM signal, and acquires transmitted information such as audio data or image data transmitted from the visible light transmitters, to perform processing for regeneration or processing for display. Further, in the case where an information signal transmitted by a visible light is unique ID information of a visible light transmitter, the content information corresponding to the ID information is regenerated or displayed.

Therefore, an audio circuit 46 for regenerating audio signals and the above-described display 57 on which images and characters are displayed are provided in the portable terminal 1, and a speaker 52 is connected to the output side of the audio circuit 46, and a microphone 51 is connected to the input side thereof. As described above, the microprocessor 48 of the portable terminal 1 extracts ID information of a visible light transmitter from image data containing a striped pattern of a light source for visible light communication (illumination fixture) which is photographed by the camera 10, to perform receiving processing.

Moreover, the microprocessor 48 reads out audio data of content information stored in advance on the basis of received ID information, and converts the audio data into an analog signal, and thereafter, outputs the audio signal to the audio circuit 46. The audio circuit 46 amplifies the audio signal, and drives the speaker 52 to regenerate the audio. The apparatus is configured to display those on the touch sensitive display 57 through the display controller 56 in the case where the received receiving data or the content information is image data or character data.

The RF (Radio Frequency) circuit 54 of the portable terminal 1 includes an antenna system or a tuner, that is configured to transmit or receive an RF signal, to perform radio communication between an access point of a wireless LAN and a base station of a mobile telephone communication network connected to the Internet or the like.

Figure 4:
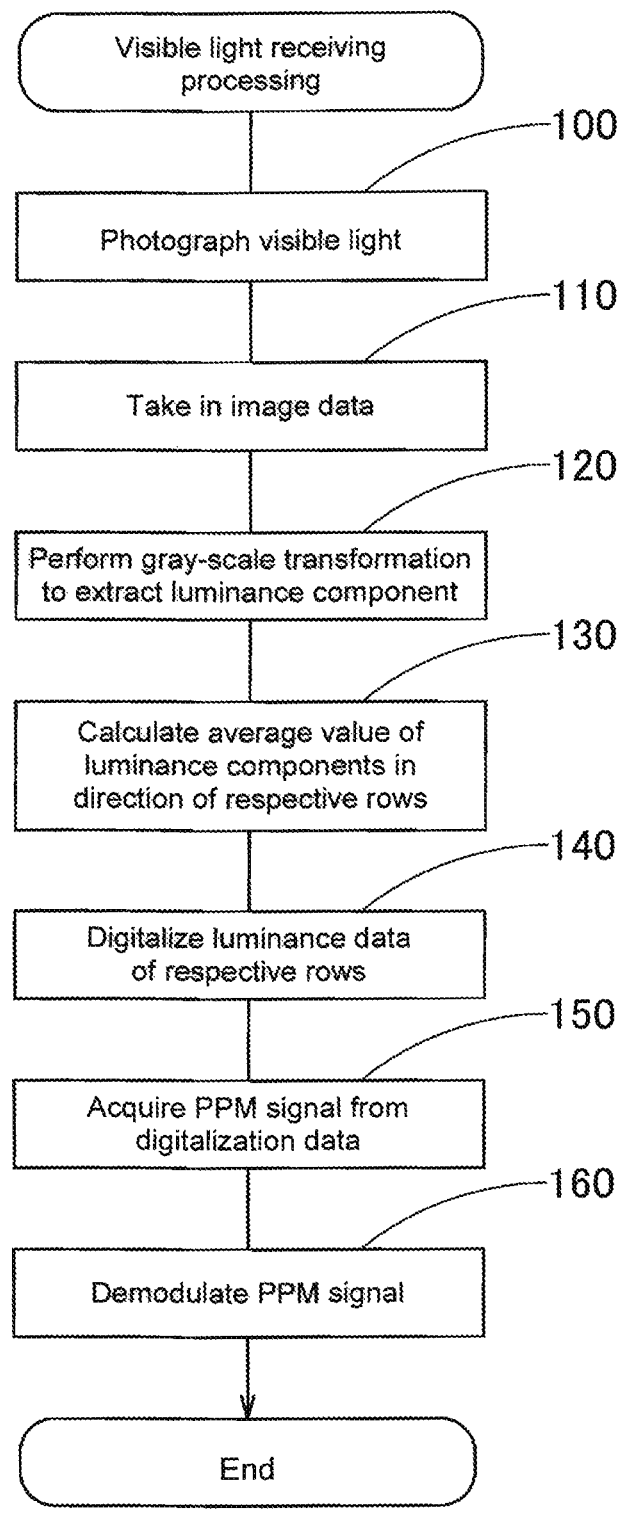
FIG. 4 is a flowchart of receiving processing of the visible light receiving apparatus.

Next, a usage mode and its operation of the visible light receiving apparatus having the above-described configuration will be described with reference to a flowchart of FIG. 4.

The mobile terminal 1 having the visible light receiving apparatus built-in is used for viewing and listening to explanatory content (audio guide) of exhibits in, for example, an art museum, a museum, or the like. In this case, visible light transmitters (for example, a visible light transmission device having a projector serving as an illumination fixture as well) (not shown) are installed in places, where the explanatory content (audio guide) is provided, in the vicinity of exhibits in its facility or the like. Different ID information is allocated to be set in the respective visible light transmitters, and the content information corresponding to the respective ID information is stored in the storage unit 50 of the portable terminal 1.

In the case where the portable terminals 1 are lent to users to be used as explanatory devices for exhibits as in an art museum and a museum, the explanatory content information is taken into those portable terminals 1 in advance so as to correspond to the respective ID information (IDs corresponding to the respective exhibits), to be stored in the storage units 50. However, these content information is stored in advance along with the ID information in a content server on a network, for example, and at the time of holding an exhibition, by operating the portable terminal 1, it is possible to access to the content server via the network, to download the content information into the portable terminal 1, and use the content information. Thereby, in the case where a new exhibition is held in an art museum, a museum, or the like, if the explanatory content thereof is downloaded in advance to be stored in the storage unit 50 of the portable terminal 1 at the start thereof, it is possible to use the portable terminal 1 as it is without connecting to the network during holding of the exhibition.

The projectors of the respective visible light transmitters serve as illumination fixtures as well in facilities such as art museums, and the light from the projector illuminates an exhibit, and the ID information denoting the explanatory content for the exhibit is subjected to PPM modulation, and the light is superimposed on a visible light, to be irradiated.

A user of the portable terminal 1 mounts the optical diffusion filter 12 on the surface of the lens 13 of the camera 10 of the portable terminal 1, or locates the optical diffusion filter 12 in the optical path, or switches the optical diffusion filter 12 from an optical transmitting state to an optical diffusion state, to cause a diffused incident light to be incident to the imaging element 11, thereby photographing the visible light illuminating the exhibit (Step 100). At this time, the camera 10 may be turned to face the projector of the visible light transmitter, i.e., the light source, to photograph the light source, or the camera 10 may be turned to face the exhibit illuminated by the light source of the projector, or the camera may be turned to face a wall surface or the like irradiated with a visible light, to photograph it. In this case, the light source of the projector is not formed as an image on the imaging element 11, and the imaging element 11 photographs an image not to be formed.

When the shutter of the camera 10 is turned on, and the imaging element 11 receives a visible light, the pixels 21 in the respective rows perform electric charge accumulations at the same timing for each row of the pixels 21, as shown a FIG. 5 on the basis of signals from the shutter signal lines 30. The pixels 21 in the respective rows perform electric charge accumulations at timings shifted in sequence row by row, and thereafter, pixel signals based on the electric charges are output in sequence from the pixels 21 in a row in which electric charges have been accumulated, to be amplified by the pixel amplifiers 22, and the pixel signals are output in sequence from all the pixels 21.

At this time, the imaging element 11 performs taking in of signals from the pixels 21, first, from the leftmost pixel 21 in the top row through the vertical signal lines 25 and the horizontal signal line 26 on the basis of switching operations of the pixel selecting switches 23 and switching operations of the column selecting switches 24. Next, the imaging element 11 performs taking in of signals from the leftmost pixel 21 to the rightmost pixel 21 in the second row, and in the same way, performs readout of signals in sequence from the pixels 21 in the third row and the fourth row, and finally, a signal is output from the rightmost pixel 21 in the bottom row. Thereby, retrieving image signals of one frame from all the pixels 21 in the imaging element 11, to be transmitted to the image processing LSI 19 of the image processing apparatus through the AD converter 18.

That is, the imaging element 11 operates so as to output signals based on the accumulated electric charges in sequence through the pixel amplifiers 22 in an exposure timing for each row, to take in the signals with respect to the respective pixels 21. At this time, first, the pixel selecting switch 23 at the top stage, which is connected to the leftmost vertical signal line 25 in FIG. 2 is turned on, and the leftmost column selecting switch 24 connected to the horizontal signal line 26 is turned on, to output a signal of the pixel 21 located at the left end at the top stage in FIG. 2. Next, the pixel selecting switch 23 in the top stage, which is connected to the second vertical signal line 25 from the left end in the same row is turned on, and the second column selecting switch 24 from the left end connected to the horizontal signal line 26 is turned on, to output a pixel signal of the pixel 21 located in the second stage from the left of the top row in FIG. 2.

In this way, the imaging element 11 performs on-off control of the pixel selecting switches 23 and the column selecting switches 24, thereby outputting signals in sequence from all the pixels 21 from the left end to the right end, first, with respect to all the pixels 21 in the top row, and thereafter, outputting signals based on the accumulated electric charges through the vertical signal lines 25 and the horizontal signal line 26 with respect to the pixels 21 in the second row from the top, and these signals are output as pixel signals in sequence from the pixels from left end to the right end. Thereafter, in the same way, signals of the respective pixels 21 are output through the vertical signal lines 25 and the horizontal signal line 26 to be taken in with respect to the pixels 21 in the third row and the fourth row, and further, the imaging element 11 finally outputs a signal from the pixel 21 in the bottom row through the rightmost vertical signal line 25.

With this, the pixel signals which are exposed and based on the accumulated electric charges are amplified by the pixel amplifiers 22 in the pixels 21 in each row in the imaging element 11, to be output in sequence and in the arrangement sequence of the respective rows from all the pixels 21, as shown in FIG. 5, through the vertical signal lines 25 and the horizontal signal line 26.

In all the pixels 21 in the imaging element 11, as described above, exposures are performed for each row, and in the case where transmission data are superimposed on the transmitted visible light, and a temporal contrast is generated in the visible light, a striped pattern based on the contrast (a horizontally-striped pattern as shown in FIG. 6) is generated along the row direction in the pixel signal containing the transmission data. The pixel signals containing such striped patterns output from the respective pixels 21 in the imaging element 11 are converted into digital signals by the AD converter 18, to be transmitted to the image processing LSI 19. The image processing LSI 19 takes in image signals of one frame, to perform image processing for retrieving the luminance information contained therein (Step 110).

For example, in the case where a visible light subjected to 4-level PPM modulation is transmitted at 4.8 Kbps on the basis of the visible light communication standard from a projector of a visible light transmitter, a time denoting one sample of a transmitted pulse signal superimposed on the visible light is about 0.5 milliseconds, and a contrast change in luminance of the visible light containing this transmitted pulse signal is generated as a striped pattern in a photographed image by the imaging element 11. The striped pattern is, as shown in FIG. 6, generated in the row direction of the imaging element 11.

When the image processing LSI 19 takes in the digital image signal containing color information and luminance information therein, the image processing LSI 19 retrieves only the luminance information, to transform the luminance information into gray-scale data of 0 to 255 gradations, for example, and extracts the luminance component of the signal, i.e., the striped pattern component, and transmits the sampled data to the microprocessor 48 (Step 120).

Figure 7:
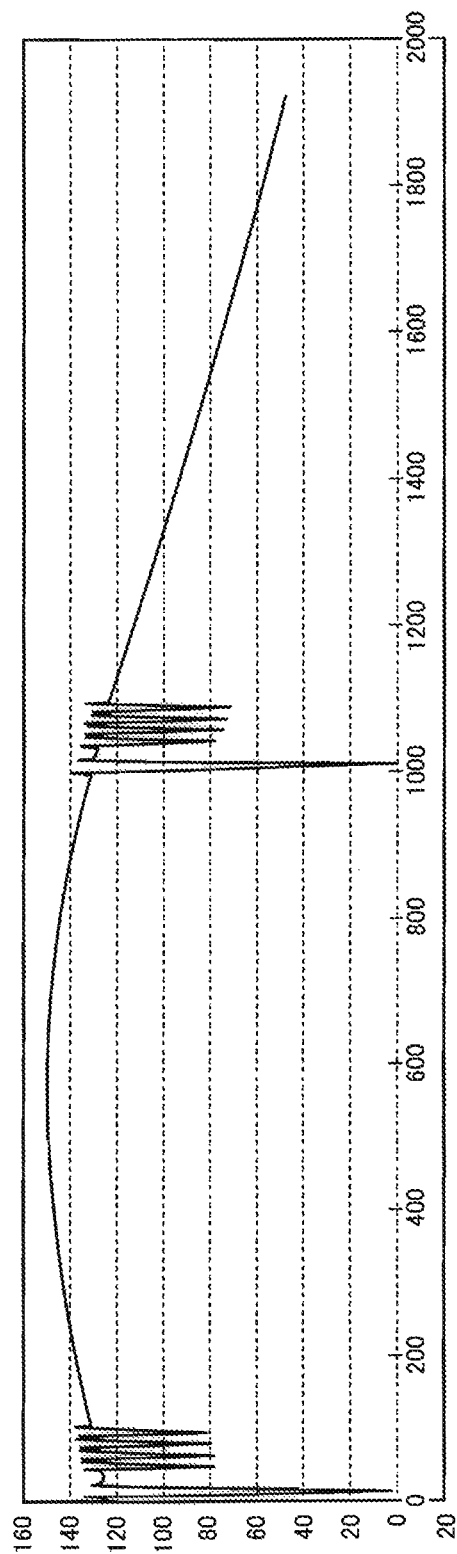
FIG. 7 is a luminance average value graph that average values of luminance components output from the pixels on the respective row lines along the row direction of the imaging element are calculated, and the luminance data of the respective row lines are graphed.

When the microprocessor 48 takes in the sampled data of the striped pattern component contained in the photographed visible light, the microprocessor 48 calculates an average value of the luminance components in the direction of the respective rows (Step 130). As shown in a luminance average value graph of FIG. 7, an average value of the luminance components in the direction of the respective rows greatly changes according to the horizontal axis (time axis) in the direction of the respective rows in the portion where the striped pattern is generated.

Figure 8:
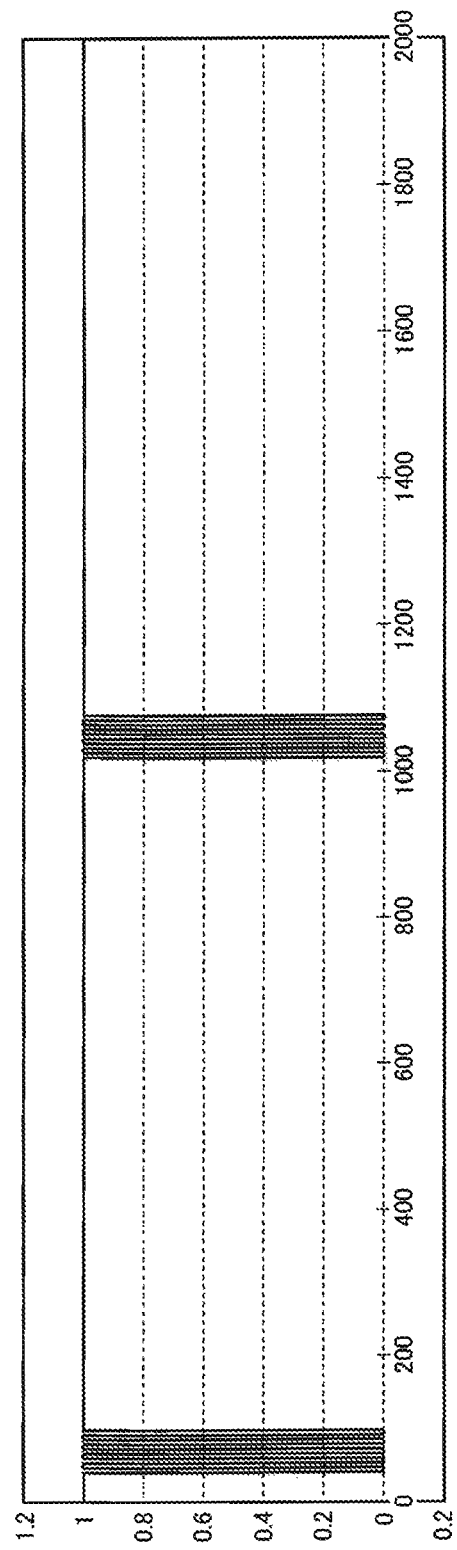
FIG. 8 is a luminance average value digitalized graph in which the luminance average values of the pixels in the respective rows are digitalized.

Moreover, the microprocessor 48 digitalizes the averaged luminance data of the respective rows (Step 140). The digitalization processing is carried out on the basis of a threshold value of luminance set in advance, and as shown in a luminance average value digitalized graph of FIG. 8, the average value digitalization data of the luminance components in the direction of the respective rows greatly change according to the horizontal axis (time axis) in the direction of the respective rows in the portion where the striped pattern is generated.

Next, the microprocessor 48 extracts the received PPM signal (the signal subjected to 4-level PPM modulation) from the digitalization data digitalized as described above (Step 150).

Next, the microprocessor 48 demodulates the extracted PPM signal, to retrieve the ID information transmitted from the visible light transmitter (Step 160). Or, in the case where the transmitted visible light transmission data are audio data or image character data, processing for regenerating those or processing for displaying those is carried out. In the case where the information signal transmitted by a visible light is unique ID information of the visible light transmitter, the content information (audio guide or the like) corresponding to the ID information is read out of the storage unit 50, to be regenerated through the speaker 52 or displayed on the display 57.

In this way, in accordance with the visible light receiving apparatus of the present invention, in the portable terminal 1 in which the general-purpose camera 10 is mounted, the optical diffusion filter 12 is mounted in the camera 10, or the optical diffusion filter 12 in an optical transmitting state for a normal time is brought into an optical diffusion state, and an optically-diffused image therefrom is photographed by the pixel amplifier sequential output type imaging element 11, to generate a striped pattern corresponding to the information signal in the row direction or the column direction in the optically-diffused image, and the information signal is captured in the photographed image. At this time, the striped pattern contained in the photographed image contains an information signal changing according to a time axis (a contrast change in luminance of the visible light to be transmitted), and the information signal transmitted through visible light communication is contained in a state of generation of the striped pattern. By extracting the information signal from this striped pattern, for the portable terminal 1 such as a mobile telephone in which the general-purpose camera 10 is mounted, there is no need to provide a dedicated light receiving element for receiving a visible light for visible light communication, and it is possible to easily receive an information signal for visible light communication by use of the general-purpose portable terminal 1.

Further, because it is possible to extract a plurality of samples of information signals contained in one-frame image data in one processing, it is possible to receive transmission data at high speed as compared with the conventional art. Further, because the imaging element 11 photographs an image not to be formed, as compared with the case where a normal camera images an object through its lens, to photograph an object image, it is possible to precisely extract receiving data without having an effect of noise due to a formed image.

In addition, in the above-described embodiment, the optical diffusion filter 12 is mounted in the camera 10, and the optically-diffused image is photographed by the pixel amplifier sequential output type imaging element 11. However, in place of the optical diffusion filter, an image out of focus, i.e., a defocused image not to be formed may be photographed, to generate a striped pattern in the defocused image. In this case, a defocused image which is out of focus and not to be formed is made incident to the imaging element 11, to photograph the defocused image, and a striped pattern is generated in the defocused image generated on the imaging element 11. In accordance therewith, because of the defocused image, a contour or the like of the object does not have a harmful effect such as noise on the striped pattern, and it is possible to extract to demodulate an information signal on the basis of a state of generation of the striped pattern.

Further, the embodiment may be configured such that a light-concentrating optical system such as the lens 13 is taken out of an optical path of a visible light incident to the camera 10, and the visible light is, not concentrated by an optical system, but directly made incident to the imaging element 11, so as to photograph an image not to be formed with the imaging element 11. In this case, the optical system such as the lens 13 may be configured to be automatically or manually taken out of an optical path of a visible light incident to the camera, by a movement mechanism at the time of using the camera for visible light communication. In accordance with this as well, because an object is not formed as an image on the imaging element, a contour or the like of the object does not have a harmful effect such as noise on a striped pattern, and it is possible to extract to demodulate an information signal on the basis of a state of generation of the striped pattern.

Moreover, as described above, the embodiment may be configured such that the shutter signal lines are installed along the column direction of the pixels 21 (in the vertical direction of FIG. 2), and electric charge accumulations are performed simultaneously and at timings shifted in sequence column by column with respect to the pixels 21 in the respective columns, and signals based on the electric charges accumulated in the pixels 21 in the respective columns are output in sequence from all the pixels 21 in the order of the respective columns.

In this case, first, a signal for the shutter is applied to all the pixels 21 in the leftmost column connected to the leftmost vertical signal line 25 in FIG. 2, to switch the changing-over switches in the respective pixels 21 to the sides of electric charge accumulations, and electric charge accumulations in all the pixels 21 in the leftmost column are performed. Thereafter, the signals based on the accumulated electric charges are output in sequence from each column from the pixels 21 in the respective columns as follows.

That is, first, only the pixel selecting switch 23 at the top stage, which is connected to the leftmost vertical signal line 25 in FIG. 2 is turned on, and only the leftmost column selecting switch 24 connected to the horizontal signal line 26 is turned on, to output a signal of the pixel 21 located at the left end in the top stage in FIG. 2. Next, only the second pixel selecting switch 23 from the top, which is connected to the leftmost vertical signal line 25 in FIG. 2 is turned on, and only the leftmost column selecting switch 24 connected to the horizontal signal line 26 is turned on, to output a pixel signal of the pixel 21 located at the second from the top in FIG. 2.

In this way, the imaging element 11 performs on-off control of the pixel selecting switches 23 and the column selecting switches 24, thereby outputting signals in sequence from the upper stage with respect to the pixels 21 in the leftmost column connected to the leftmost vertical signal line 25, and thereafter, in the same way, outputting signals in sequence from the upper stage with respect to the pixels 21 disposed in the second column from the left through the vertical signal line 25 in the second column from the left. Thereafter, in the same way, signals of the pixels 21 in the respective rows and columns are output through the vertical signal lines 25 on the third column and the fourth column, to be taken in, and moreover, the imaging element 11 finally outputs signals of the respective pixels 21 in the respective rows and columns through the rightmost vertical signal line 25. Thereby, generating a striped pattern which is imaged in one frame of the photographed image, and contains an information signal contained in the transmitted visible light, in the column direction of the pixels 21.

In this way, in the case where electric charge accumulations are performed simultaneously and at timings shifted in sequence column by column with respect to the pixels 21 in the respective columns, a striped pattern along the column direction (vertically-striped pattern) is generated in a photographed image, and because transmitted transmission data are contained in the vertically-striped pattern, it is possible to extract the transmitted data on the basis of the striped pattern along the column direction.

Figure 9:
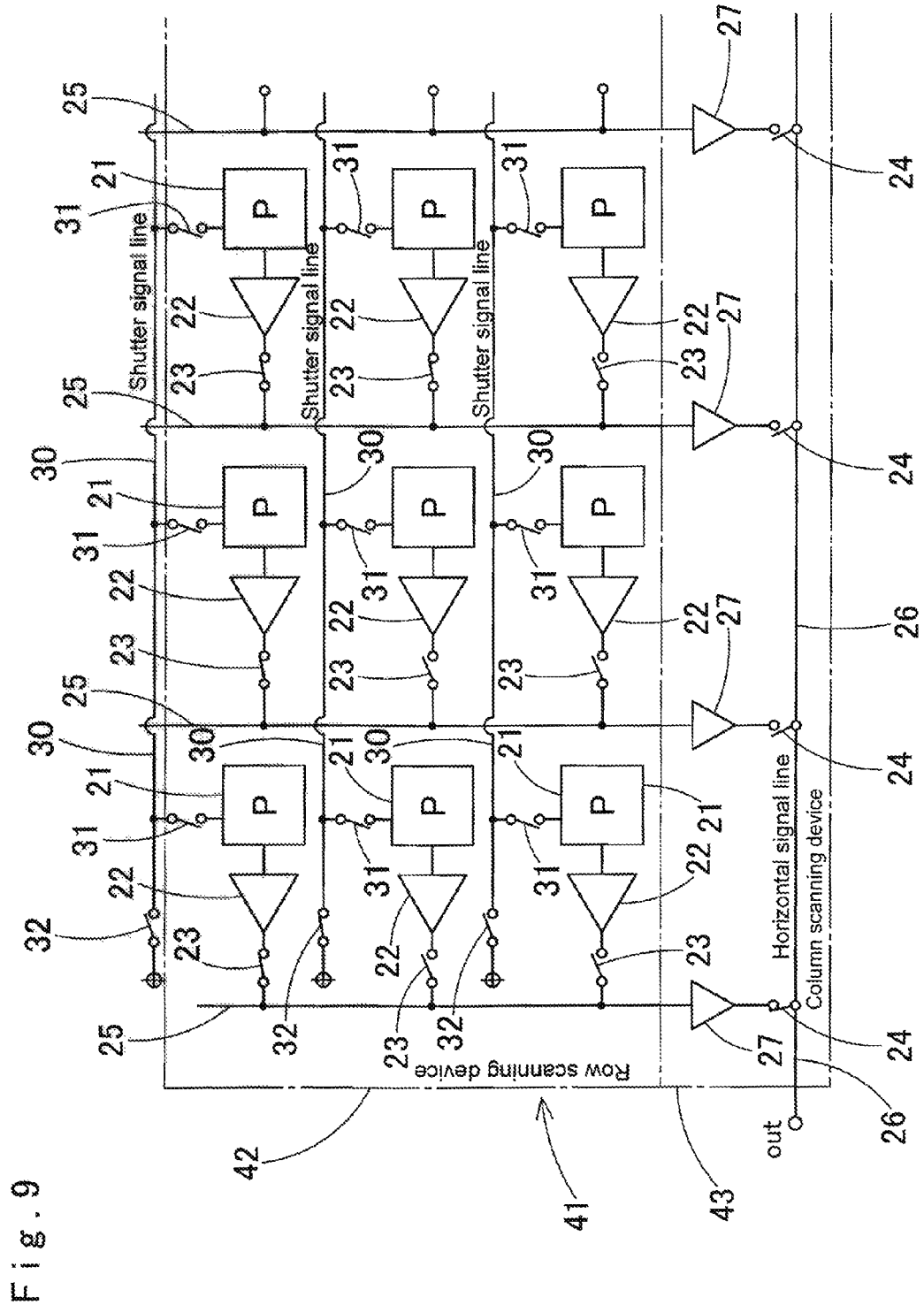
FIG. 9 is a schematic configuration block diagram of a pixel amplifier sequential output type imaging element showing another embodiment.
Figure 10:
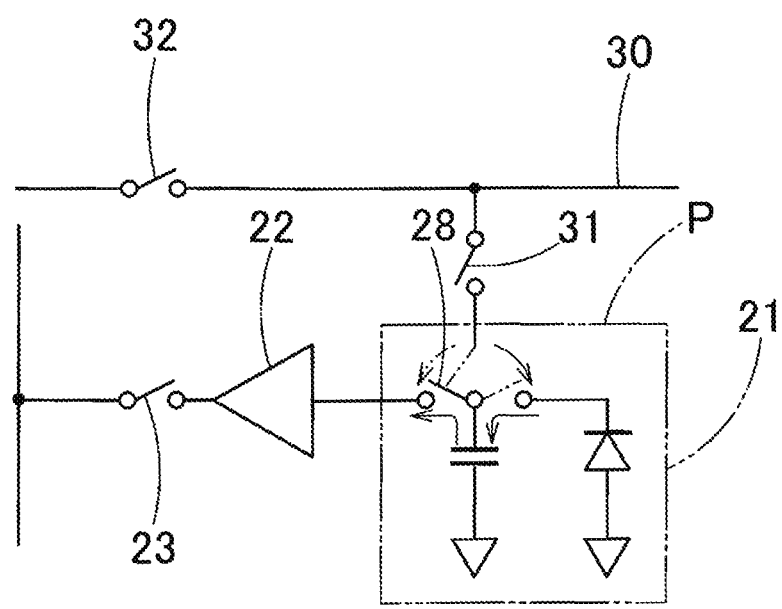
FIG. 10 is a circuit configuration explanatory diagram of a pixel of the embodiment.

FIGS. 9 to 12 show a visible light receiving apparatus of another embodiment, and in the visible light receiving apparatus of this example, in place of the above-described striped pattern, an intermittent pattern which is intermittent is generated in a row or in a column of the pixels 21 in an imaging element 41, and an information signal of a transmitted visible light is received on the basis of the intermittent pattern. FIG. 9 shows a configuration of the imaging element 41 of a camera, and FIG. 10 shows a connecting state of the pixels 21. In addition, portions which are similar to those of the imaging element 11 of the camera 10 are denoted by reference numerals which are the same as those described above in FIGS. 9 and 10, and descriptions thereof will be omitted.

This imaging element 41 of the camera is a pixel amplifier sequential output type imaging element in which electric charges generated in the respective pixels 21 are amplified by the respective pixel amplifiers 22, to output imaging signals in sequence from the respective pixel amplifiers 22, and is built into the portable terminal 1 in the same way as described above. A CMOS image sensor is used as the imaging element 41 which is a pixel amplifier sequential output type imaging element, and the scanning device of the imaging element 41 is composed of a row scanning device 42 that performs scanning along the row direction, and a column scanning device 43 that performs scanning along the column direction as shown in FIG. 9.

In the pixel amplifier sequential output type imaging element 41 formed of the CMOS image sensor, as shown in FIG. 9, many pixels 21 are arrayed in a matrix state of rows and columns, and the pixel amplifiers 22 are respectively provided on the output sides of the respective pixels 21, and the output sides of the pixel amplifiers 22 are connected to the vertical signal lines 25 via the pixel selecting switches 23. The row scanning device 42 is configured such that signals of electric charges in the respective pixels 21 arrayed in a matrix state are amplified by the pixel amplifiers 22, to be transmitted to the respective vertical signal lines 25 in the column direction, which are connected to the output sides thereof through the pixel selecting switches 23, and signals based on the electric charges in the respective pixels 21 in the respective rows are output in sequence through the respective vertical signal lines 25. As shown in FIG. 10, a changing-over switch 28 that switches between an electric charge accumulating state in which electric charges generated at the time of exposure are accumulated and a state in which signals are output on the basis of accumulated electric charges is provided to each pixel 21.

Further, the column scanning device 43 is configured such that the column selecting switches 24 connected to the output sides of the respective vertical signal lines 25 are connected to the one horizontal signal line 26, and the vertical signal lines 25 in the column direction are selected by performing on-off control of the respective column selecting switches 24, to output signals based on the electric charges thereof from the pixels 21 of the respective vertical signal lines 25 through the one horizontal signal line 26. That is, the respective vertical signal lines 25 are disposed along the column direction, and the output sides of the pixels 21 on the respective row lines, which are disposed in the direction of the respective rows, are connected to the vertical signal lines 25 via the pixel amplifiers 22 and the pixel selecting switches 23.

The vertical signal lines 25 are extended toward the column direction, and disposed parallel to the columns along the many pixels 21 disposed in the respective columns in a matrix state. The second amplifiers 27 are connected to the bottom ends of the respective vertical signal lines 25, and the output sides of the second amplifiers 27 are connected to the one horizontal signal line 26 via the column selecting switches 24.

Moreover, as shown in FIG. 9, the shutter signal lines 30 are installed along the row direction with respect to the respective rows of the respective pixels 21 which are arrayed in the direction of the respective rows in the row scanning device 42. This shutter signal line 30 is a line for generating a signal that carries out a shutter operation of the camera 10, that is, causes the respective pixels 21 to output image signals, and the row selecting switches 32 are connected in series with the respective shutter signal lines 30 in the respective rows, and the image selecting switches 31 are connected between the respective shutter signal lines 30 and the respective pixels 21.

The imaging element 41 is configured to perform electric charge accumulations in sequence from the top row to the bottom row with respect to all the pixels 21 at the time of a shutter operation of the camera 10, and to output signals on the basis of accumulated electric charges thereof in sequence from the respective pixels 21 in which electric charge accumulations have been performed. Such operations for electric charge accumulations and signal outputs which are performed in sequence with respect to all the pixels 21 are performed by performing on-off control of the pixel selecting switches 23, the pixel selecting switches 31, the row selecting switches 32, and the column selecting switches 24 by the controller of the camera 10, to control that signals are output in sequence through the pixels amplifiers 22 for each pixel 21 from all the pixels 21, to be transmitted to the AD converter through the vertical signal lines 25 and the horizontal signal line 26.

For example, in the case where all the pixels 21 are scanned to output signals for each row, first, in FIG. 9, the row selecting switch 32 of the shutter signal line 30 in the top row is turned on, and in order to retrieve signals in sequence from the leftmost pixel 21 in the top row, the pixel selecting switch 31 of the leftmost pixel 21 in the top row is turned on, and the changing-over switch 28 in FIG. 10 is switched to the side of electric charge accumulation, to perform electric charge accumulation first. Thereafter, the changing-over switch 28 is switched from the electric charge accumulation to the side of signal output, to amplify the signal through the pixel amplifier 22, and further, the pixel selecting switch 23 on the output side is turned on, to cause the vertical signal line 25 to output the signal.

Figure 11:
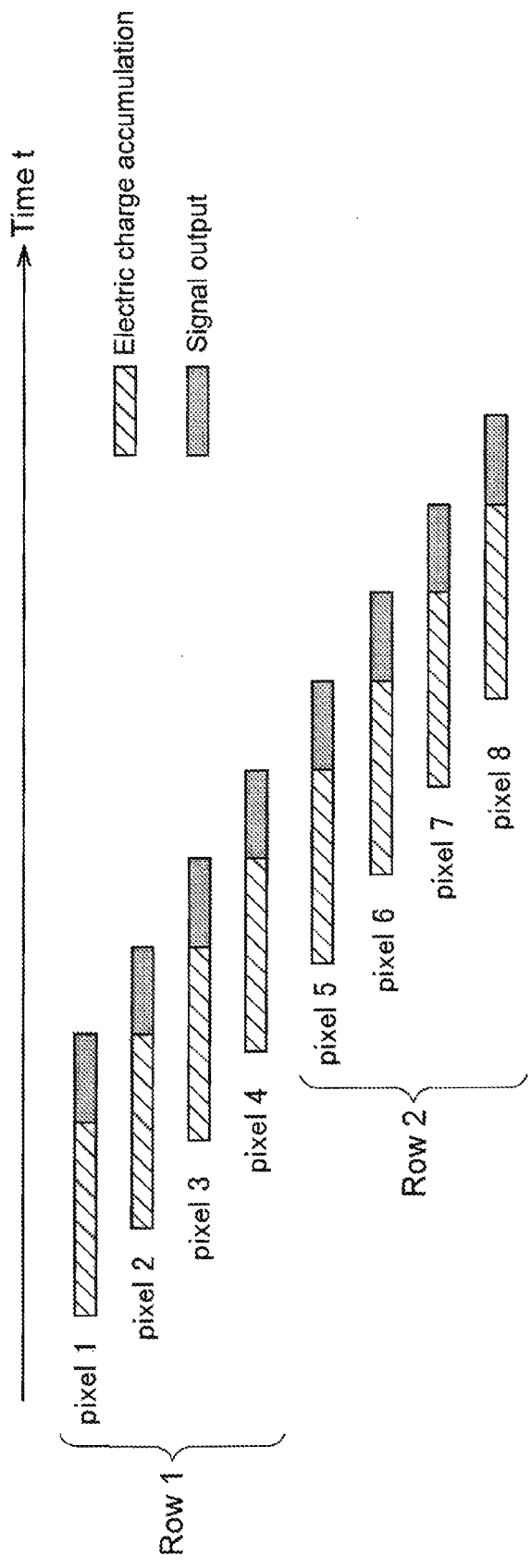
FIG. 11 is an explanatory diagram showing electric charge accumulation timings in the respective pixels, and signal output timings of the respective pixels.

In accordance with this, as shown in FIG. 11, first, electric charge accumulation is performed in the leftmost pixel 21 in the top row, and next, a signal based on the accumulated electric charges is output through the leftmost vertical signal line 25, and an image signal is output to the one horizontal signal line 26 through the second amplifier 27 and the column selecting switch 24, to be taken into the image processing LSI 19. Such electric charge accumulations and signal outputs with respect to the pixels 21 are, as described above, performed from the left to the right, first, with respect to the pixels 21 in the top row, and next, the same operations are executed with respect to the pixels 21 in the second row, and signals are output in sequence to the vertical signal lines 25 through the pixel selecting switches 23 from the respective pixels 21 in the second row. In the same way, with respect to the pixels 21 in the third row and the respective pixels 21 in the fourth row as well, electric charge accumulations and signal outputs are performed in the same way, and signals are output in sequence to the vertical signal lines 25 through the pixel selecting switches 23 from the respective pixels 21.

Then, the signals on the vertical signal lines 25 are output to the horizontal signal line 26 through the second amplifiers 27 and the column selecting switches 24.

The above-described operations are repeated with respect to all the pixels 21, and the image signals are output to the vertical signal lines 25 through the pixel amplifiers 22 and the pixel selecting switches 23 from the respective pixels 21, and the signals are output to the one horizontal signal line 26 through the vertical signal lines 25, the second amplifiers 27, and the column selecting switches 24, to be taken into the image processing LSI 19. The image processing LSI 19 is operated such that image signals thereof are processed as one sample for every respective pixel 21.

Then, the image sampled data is transmitted to the microprocessor 48 from the image processing LSI 19, and the microprocessor 48 demodulates the transmitted information signal on the basis of the sampled data. Accordingly, means for extracting and demodulating an information signal on the basis of generation of an intermittent pattern generated in a row or in a column of the pixels 21 is composed of the image processing LSI 19, the AD converter 18, and the microprocessor 48.

Figure 12:
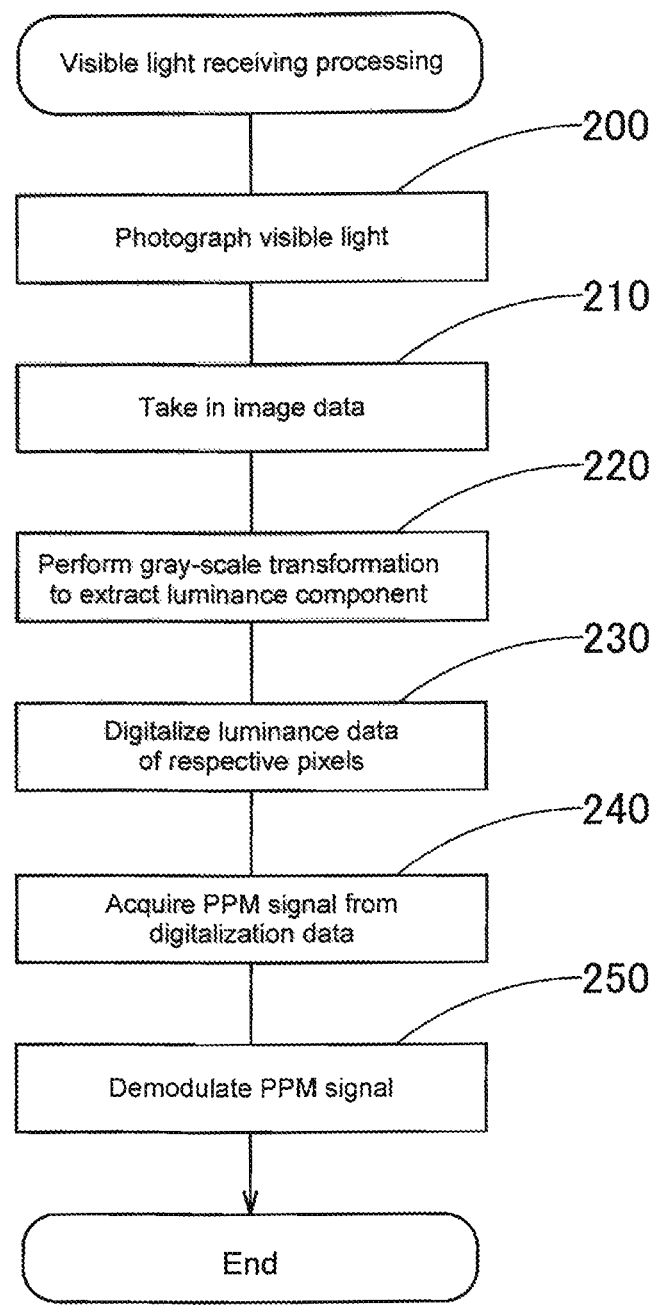
FIG. 12 is a flowchart of receiving processing of the visible light receiving apparatus of the embodiment.

Next, the operation of the visible light receiving apparatus will be described with reference to a timing explanatory diagram of FIG. 11 and a flowchart of FIG. 12.

A user of the portable terminal 1 mounts the optical diffusion filter 12 on the surface of the lens 13 of the camera 10 of the portable terminal 1, or allows an incident light to be incident to the imaging element 11 through the built-in optical diffusion filter 12, thereby photographing the visible light illuminating an exhibit (Step 200).

At this time, the camera 10 may be turned to face the projector of the visible light transmitter, i.e., the light source, to photograph the light source, or the camera 10 may be turned to face the exhibit illuminated by the light source of the projector, or the camera may be turned to face a wall surface or the like which is irradiated with a visible light, to photograph it. In this case, the light source of the projector is not formed as an image on the imaging element 41, and the imaging element 41 photographs an image not to be formed.

At this time, when the shutter of the pixel amplifier sequential output type imaging element 41 is turned on, the row selecting switches 32 of the shutter signal lines 30 in the respective rows are turned on in sequence from the top row, and the pixel selecting switches 31 in the respective columns are turned on to operate in sequence in the respective rows. In accordance therewith, in the pixels 21 receiving the visible light, after the respective pixels 21 perform exposure operations in sequence first in the top row, the changing-over switch 28 in FIG. 10 is switched from electric charge accumulation to signal output, thereby outputting signals based on the accumulated electric charges in the respective pixels 21 in the respective rows in sequence from the respective pixels 21. The signals are amplified by the pixel amplifiers 22 of the respective pixels 21, and the image signals are output in sequence from the respective pixels 21, to be transmitted to the image processing apparatus through the respective vertical signal lines 25, the second amplifiers 27, and the column selecting switches 24 (Step 210), and the light-receiving signals of the respective pixels 21 are processed as data of one sample.

The operations of the pixels 21 in the imaging element 41 are performed in sequence, for example, from the top row to the bottom row at timings as shown in FIG. 11, and the signals are output in sequence from all the pixels 21. That is, in the imaging element 41, first, the row selecting switch 32 of the shutter signal line 30 at the top stage of FIG. 9 is turned on, and the pixel selecting switch 31 next thereto is turned on, and when the changing-over switch 28 of FIG. 10 is switched to the side of electric charge accumulation, electric charges are accumulated in the leftmost pixel 21 in the top stage, and thereafter, the changing-over switch 28 is switched to the side of signal output, and the signals are amplified by the pixel amplifiers 22 to be output. The output signals are output to the leftmost vertical signal line 25 by an on operation of the pixel selecting switch 23, and the signals of the vertical signal line 25 is output to the horizontal signal line 26 through the second amplifier 27 and the column selecting switch 24, and the leftmost pixel signal in the top stage is taken into the image processing LSI 19 (Step 210).

Next, the second row selecting switch 32 of the shutter signal line 30 in the top stage of FIG. 9 is turned on, and the second pixel selecting switch 31 from the left end in the top stage is turned on, thereby accumulating electric charges in the pixels 21 second from the left end of the top stage. Thereafter, a signal based on the electric charges is output from the pixel 21, to be amplified in the pixel amplifier 22, and the pixel selecting switch 23 is turned on, thereby outputting its pixel signal to the second vertical signal line 25 from the left end. The pixel signal of the second vertical signal line 25 is output to the horizontal signal line 26 through the second amplifier 27 and the column selecting switch 24 in the same way as described above, and the pixel signal second from the left end on the top stage is input as a pixel image for one sample into the image processing LSI 19.

With this, in the imaging element 41, signals are output in sequence from the respective pixels 21 in the top stage, and their pixel images are output in sequence through the respective vertical signal lines 25, and through the horizontal signal line 26 from the second amplifiers 27 of respective vertical signal lines 25 and the column selecting switches 24 from the respective pixels 21 in the top stage.

Next, the row selecting switch 32 of the shutter signal line 30 in the second row is turned on, and in the same way as described above, electric charges in the leftmost pixel 21 in the second row are amplified in the pixel amplifier 22, to be output, and the pixel signal is output to the vertical signal line 25 by an on operation of the pixel selecting switch 23. The pixel signal from the leftmost pixel 21 in the second row is output from the second amplifier 27 through the column selecting switch 24 to the horizontal signal line 26, and the pixel signal second from the left end is input as a pixel image for one sample into the image processing LSI 19.

In this way, the signal electric charges accumulated in the respective pixels 21 of the imaging element 41 are amplified by the pixel amplifiers 22, to be output for every respective pixel 21. With this, in the imaging element 41, exposures are performed for every respective pixel 21, and the signals of the respective pixels 21 are output in sequence. The pixel signals output from the respective pixels 21 of the imaging element 41 are converted into digital signals by the AD converter 18, to be transmitted to the image processing LSI 19, and are taken therein (Step 210).

The image processing LSI 19 takes in image signals of one frame, and in the imaging element 41, image signals for every respective pixel 21 are input to be processed as one sample. Therefore, the image processing LSI 19 is capable of sampling the image signals at extremely high speed, to retrieve luminance information contained in the image signals.

For example, in the case where a visible light subjected to 4-level PPM modulation is transmitted at 4.8 Kbps on the basis of the visible light communication standard from a projector of a visible light transmitter, a time denoting one sample of a transmitted pulse signal superimposed on the visible light is about 0.5 milliseconds, and a contrast change in luminance of the visible light containing this transmitted pulse signal is generated as an intermittent pattern which is intermittent in a row in a photographed image by the imaging element 41. The intermittent pattern which is intermittent is generated in the row direction of the imaging element 41, and such an intermittent pattern is generated according to an information signal contained in a pixel signal of each pixel 21.

Next, when the image processing LSI 19 takes in the image signal containing color information and luminance information therein, the image processing LSI 19 retrieves only the luminance information, to transform the luminance information into gray-scale data of 0 to 255 gradations, for example, and extracts the luminance component of the signal, i.e., the striped pattern component which is intermittent, and transmits the sampled data to the microprocessor 48 (Step 220).

The microprocessor 48 digitalizes the luminance data of each pixel 21 (Step 230). The digitalization processing is carried out on the basis of a threshold value of luminance set in advance, and the digitalization data of the luminance components of the respective pixels 21 greatly change according to the horizontal axis (time axis) in the direction of the respective rows, and change according to a time in which the striped pattern is intermittent in the portion where the intermittent striped pattern is generated. Then, the microprocessor 48 extracts the received PPM signal (the signal subjected to 4-level PPM modulation) from the digitalization data digitalized as described above (Step 240).

Next, the microprocessor 48 demodulates the extracted PPM signal, to retrieve the ID information transmitted from the visible light transmitter (Step 250). Or, in the case where the transmitted visible light transmission data are audio data or image character data, processing for regenerating those or processing for displaying those is carried out. In the case where the information signal transmitted by a visible light is unique ID information of the visible light transmitter, the content information (audio guide or the like) corresponding to the ID information is read out of the storage unit 50, to be regenerated through the speaker 52 or displayed on the display 57.

In addition, the above-described embodiment is configured, as shown in FIG. 9, such that the shutter signal lines 30 are installed along the row direction of the pixels 21 (in the horizontal cross direction of FIG. 9), and electric charge accumulations and signal outputs thereafter are performed at timings shifted in sequence with respect to the pixels 21 of the respective rows. However, the embodiment may be configured such that the shutter signal lines are installed along the column direction of the pixels 21 (in the vertical direction of FIG. 2), and electric charge accumulations are performed at timings shifted in sequence in the column direction with respect to the pixels 21 in the respective columns, and thereafter, signal outputs are performed.

In this case, an intermittent pattern which is imaged in one frame of a photographed image, and contains an information signal contained in a transmitted visible light is generated in the column direction of the pixels 21. That is, electric charge accumulations are performed at timings shifted in sequence column by column with respect to the pixels 21 in the respective columns, thereby generating an intermittent pattern along the column direction in a photographed image. Thereafter, signals based on the accumulated electric charges are output from the pixels 21 of the respective columns, thereby generating an intermittent pattern along the row direction in a photographed image, and it is possible to extract transmission data contained in the intermittent pattern.

In this way, the camera of the portable terminal 1 photographs an optically-diffused image by the pixel amplifier sequential output type imaging element 41, to generate an intermittent pattern corresponding to the information signal in the row direction or the column direction in the optically-diffused image, and capture an information signal in the photographed image. At this time, the intermittent pattern which is intermittent and contained in the photographed image contains an information signal changing according to a time axis (a contrast change in luminance of the visible light to be transmitted), and the information signal transmitted through visible light communication is contained in a state of generation of the intermittent pattern which is intermittent. By extracting the information signal from this intermittent pattern which is intermittent, for the portable terminal 1 such as a mobile telephone in which the general-purpose camera 10 is mounted, there is no need to provide a dedicated light receiving element for receiving a visible light for visible light communication, and it is possible to easily receive an information signal for visible light communication by use of the general-purpose portable terminal 1.

Further, because it is possible to perform sampling at high speed to extract information signals acquired for every respective pixel 21 as one sample, it is possible to receive transmission data at high speed as compared with the conventional art. Further, because the imaging element 41 photographs an image not to be formed, in the same way as described above, as compared with the case where a normal camera images an object through its lens, to photograph an object image, it is possible to precisely extract receiving data without having an effect of noise due to a formed image.

What is claimed is:

1. A visible light receiving method comprising:
   a step of photographing a visible light that an information signal is superimposed on the visible light, and which is irradiated for visible light communication, as an image not to be formed, by the imaging element with a camera having a pixel amplifier sequential output type imaging element; and
   with the imaging element of the camera, a step of amplifying electric charges generated in respective pixels by respective pixel amplifiers, to output imaging signals in sequence from the respective pixel amplifiers;
   a step of carrying out image processing of image data acquired from the imaging signals by frame; and
   a step of extracting and demodulating information signals of a plurality of samples in one frame,
   wherein the imaging element accumulates electric charges in the pixels in the row or the pixels in the column at a timing for each row or each column of pixels, to output signals based on the electric charges accumulated in the respective pixels in sequence at timings for respective pixels from the pixel amplifiers of the respective pixels, and
   generates a striped pattern based on an information signal in the row direction or the column direction of the pixels in the photographed optically-diffused image, thereby extracting and demodulating the information signal on the basis of a state of generation of the striped pattern.

2. The visible light receiving method according to claim 1, wherein the optical diffusion filter is a film liquid crystal that switches between optical diffusion and optical transmission according to an applied voltage.

3. The visible light receiving method according to claim 2, wherein the optical diffusion filter is a film liquid crystal that switches between optical diffusion and optical transmission according to an applied voltage.

4. The visible light receiving method according to claim 1, wherein the camera allows a defocused image not to be formed, to be incident onto the pixel amplifier sequential output type imaging element, to photograph the defocused image.

5. The visible light receiving method according to claim 1, wherein the camera in which a light-concentrating optical system is taken out of an optical path of a visible light, allows an image not to be formed, to be incident onto the pixel amplifier sequential output type imaging element, to photograph the image.

6. The visible light receiving method according to claim 1, wherein a color image signal which is imaged by the camera to be output is subjected to gray-scale transformation, so as to be transformed into a black-and-white image signal, and to extract its luminance component.

7. The visible light receiving method according to claim 1, wherein a luminance component is extracted for each color signal from a color image signal which is imaged by the camera to be output.

8. The visible light receiving method according to claim 1, wherein an average value of luminance components output from pixels on the respective row lines along the row direction of the imaging element, to generate luminance data of the respective row lines, and the luminance data is digitalized to extract a received information signal.

9. A visible light receiving method comprising:
a step of photographing a visible light that an information signal is superimposed on the visible light, and which is irradiated for visible light communication, as an image not to be formed, by the imaging element with a camera having a pixel amplifier sequential output type imaging element; and
with the imaging element of the camera, a step of amplifying electric charges generated in respective pixels by respective pixel amplifiers, to output imaging signals in sequence from the respective pixel amplifiers;
a step of carrying out image processing of image data acquired from the imaging signals by frame; and
a step of extracting and demodulating information signals of a plurality of samples in one frame,
wherein the imaging element accumulates electric charges at timings for respective pixels, to output signals based on the electric charges accumulated in the respective pixels in sequence at timings for respective pixels from the pixel amplifiers of the respective pixels, and
generates an intermittent pattern which is intermittent on the basis of an information signal in a row or in a column of the pixels in the photographed optically-diffused image, thereby extracting and demodulating the information signal on the basis of a state of generation of the intermittent pattern generated in the row or in the column.

10. The visible light receiving method according to claim 9, wherein the optical diffusion filter is a film liquid crystal that switches between optical diffusion and optical transmission according to an applied voltage.

11. The visible light receiving method according to claim 10, wherein the optical diffusion filter is a film liquid crystal that switches between optical diffusion and optical transmission according to an applied voltage.

12. The visible light receiving method according to claim 9, wherein the camera allows a defocused image not to be formed, to be incident onto the pixel amplifier sequential output type imaging element, to photograph the defocused image.

13. The visible light receiving method according to claim 9, wherein the camera in which a light-concentrating optical system is taken out of an optical path of a visible light, allows an image not to be formed, to be incident onto the pixel amplifier sequential output type imaging element, to photograph the image.

14. The visible light receiving method according to claim 9, wherein a color image signal which is imaged by the camera to be output is subjected to gray-scale transformation, so as to be transformed into a black-and-white image signal, and to extract its luminance component.

15. The visible light receiving method according to claim 9, wherein a luminance component is extracted for each color signal from a color image signal which is imaged by the camera to be output.

16. The visible light receiving method according to claim 9, wherein an average value of luminance components output from pixels on the respective row lines along the row direction of the imaging element, to generate luminance data of the respective row lines, and the luminance data is digitalized to extract a received information signal.

17. A visible light receiving apparatus which photographs a visible light irradiated for visible light communication with a camera having an imaging element, and receives an information signal which is superimposed on the visible light to be transmitted, on the basis of image data from the imaging element photographed by the camera, the apparatus wherein
the camera includes
a pixel amplifier sequential output type imaging element in which electric charges generated in respective pixels are amplified by respective pixel amplifiers, to output signals in sequence from the respective pixel amplifiers for the respective pixels,
an optical diffusion filter which changes the visible light into a diffusion light, to be incident to the imaging element, and generates a striped pattern on the imaging element,
photographing means for photographing the striped pattern of the visible light generated on the imaging element through the optical diffusion filter, and
means for generating a striped pattern corresponding to the received information signal in a row or in a column of the pixels in the photographed optically-diffused image, and for extracting and demodulating the information signal on the basis of a state of generation of the striped pattern generated in the row or in the column.

18. The visible light receiving apparatus according to claim 17, wherein the optical diffusion filter is a film liquid crystal that switches between optical diffusion and optical transmission according to an applied voltage.

19. A visible light receiving apparatus which photographs a visible light irradiated for visible light communication with a camera having an imaging element, and receives an information signal which is superimposed on the visible light to be transmitted, on the basis of image data from the imaging element photographed by the camera, the apparatus wherein
the camera includes
a pixel amplifier sequential output type imaging element in which electric charges generated in respective pixels are amplified by respective pixel amplifiers, to output signals in sequence from the respective pixel amplifiers for the respective pixels,
an optical diffusion filter which changes the visible light into a diffusion light, to be incident to the imaging element, and generates a striped pattern on the imaging element, photographing means for photographing the striped pattern of the visible light generated on the imaging element through the optical diffusion filter, and means for generating an intermittent pattern which is intermittent corresponding to the received information signal in a row or in a column of the pixels in the photographed optically-diffused image, and for extracting and demodulating the information signal on the basis of a state of generation of the intermittent pattern generated in the row or in the column.

20. The visible light receiving apparatus according to claim 19, wherein the optical diffusion filter is a film liquid crystal that switches between optical diffusion and optical transmission according to an applied voltage.

21. A visible light receiving apparatus which photographs a visible light irradiated for visible light communication with a camera having an imaging element, and receives an information signal which is superimposed on the visible light to be transmitted, on the basis of image data from the imaging element photographed by the camera, the apparatus wherein the camera includes a pixel amplifier sequential output type imaging element in which electric charges generated in respective pixels are amplified by respective pixel amplifiers, to output signals in sequence from the respective pixel amplifiers for the respective pixels, photographing means for allowing a defocused image not to be formed, to be incident onto the imaging element, to photograph a striped pattern generated in the defocused image, and means for generating a striped pattern corresponding to the received information signal in the row direction or the column direction of the pixels in the photographed defocused image, and for extracting and demodulating the information signal on the basis of a state of generation of the striped pattern.

22. A visible light receiving apparatus which photographs a visible light irradiated for visible light communication with a camera having an imaging element, and receives an information signal which is superimposed on the visible light to be transmitted, on the basis of image data from the imaging element photographed by the camera, the apparatus wherein the camera includes a pixel amplifier sequential output type imaging element in which electric charges generated in respective pixels are amplified by respective pixel amplifiers, to output signals in sequence from the respective pixel amplifiers for the respective pixels, photographing means for allowing a defocused image not to be formed, to be incident onto the imaging element, to photograph a striped pattern generated in the defocused image, and means for generating an intermittent pattern which is intermittent corresponding to the received information signal in the row direction or the column direction of the pixels in the photographed defocused image, and for extracting and demodulating the information signal on the basis of a state of generation of the intermittent pattern.

* * * * *